(12) United States Patent
Nakanishi

(10) Patent No.: US 7,154,458 B2
(45) Date of Patent: Dec. 26, 2006

(54) VIDEO DISPLAY DEVICE WITH SPATIAL LIGHT MODULATOR

(75) Inventor: Shuichi Nakanishi, Tokyo (JP)

(73) Assignee: NEC Viewtechnology, Ltd., Tokyo (JP)

( * ) Notice: Subject to any disclaimer, the term of this patent is extended or adjusted under 35 U.S.C. 154(b) by 516 days.

(21) Appl. No.: 10/644,726

(22) Filed: Aug. 21, 2003

(65) Prior Publication Data

US 2004/0036668 A1    Feb. 26, 2004

(30) Foreign Application Priority Data

Aug. 21, 2002    (JP)    ............................. 2002-241241
Sep. 24, 2002    (JP)    ............................. 2002-278227

(51) Int. Cl.
G09G 3/34    (2006.01)

(52) U.S. Cl. .................. 345/84; 345/32; 345/204; 359/237; 359/290

(58) Field of Classification Search ................ 345/32, 345/82, 104, 204, 589, 690; 348/750; 359/11, 359/196, 220, 221, 237; 250/227.14, 578.1
See application file for complete search history.

(56) References Cited

U.S. PATENT DOCUMENTS

| | | | |
|---|---|---|---|
| 6,184,852 B1* | 2/2001 | Millward et al. | 345/84 |
| 6,281,949 B1* | 8/2001 | Matsui et al. | 348/750 |
| 6,407,766 B1* | 6/2002 | Ramanujan et al. | 347/239 |
| 6,453,067 B1* | 9/2002 | Morgan et al. | 382/162 |
| 6,568,811 B1* | 5/2003 | Noda et al. | 353/31 |
| 6,726,333 B1* | 4/2004 | Huibers et al. | 353/84 |
| 6,831,624 B1* | 12/2004 | Harrold | 345/98 |
| 6,961,038 B1* | 11/2005 | Yoshinaga et al. | 345/84 |
| 2002/0021267 A1* | 2/2002 | Walker et al. | 345/76 |
| 2002/0041708 A1* | 4/2002 | Pettitt | 382/167 |
| 2003/0156330 A1* | 8/2003 | Edlinger et al. | 359/618 |
| 2003/0214725 A1* | 11/2003 | Akiyama | 359/640 |

FOREIGN PATENT DOCUMENTS

| | | |
|---|---|---|
| JP | 6-289387 | 10/1994 |
| JP | 8-240779 | 9/1996 |
| JP | 9-501298 | 2/1997 |
| JP | 10-269802 | 10/1998 |
| JP | 10-326080 | 12/1998 |
| JP | 11-32278 | 2/1999 |
| JP | 11-102170 | 4/1999 |
| JP | 2000-56410 | 2/2000 |
| JP | 2001-184037 | 7/2001 |
| JP | 2001-343706 | 12/2001 |
| JP | 2002-72966 | 3/2002 |
| JP | 2002-82652 | 3/2002 |
| JP | 2002-149116 | 5/2002 |
| JP | 2002-290986 | 10/2002 |

* cited by examiner

Primary Examiner—Richard Hjerpe
Assistant Examiner—Rodney Amadiz
(74) Attorney, Agent, or Firm—Young & Thompson

(57) ABSTRACT

A spatial light modulating-type video display device is provided which has excellent color reproductivity of a video even when a light source is used which emits light having chromaticity coordinates of each of three primary colors (R, G, and B) being different from those designated by specifications of colorimetry. The video display device has a red color light source being driven by the red color light source driving circuit and emitting red color light being, a green color light source being driven by the green color light source driving circuit and emitting green color light, and a blue color light source being driven by the blue color light source driving circuit and emitting blue color light, spatial light modulators each performing spatial modulation on red color light, green color light, and blue color light, an image synthesis optical system to synthesize spatially modulated light, a selecting circuit to select orders of video signals to modulate incident light in each spatial light modulator, and a control circuit to control driving timing and/or driving current of the light sources in each of the spatial light modulators and timing of selection in the selecting circuit.

28 Claims, 14 Drawing Sheets

VIDEO DISPLAY DEVICE WITH SPATIAL LIGHT MODULATOR

BACKGROUND OF THE INVENTION

1. Field of the Invention

The present invention relates to an improved video display device to display a color video by spatially modulating light obtained by adding red color light, green color light, and blue color light, or light obtained by adding white color light in addition to light obtained by adding the red color light, the green color light, and the blue color light.

The present application claims priority of Japanese Patent Application No. 2002-241241 filed on Aug. 21, 2002, which is hereby incorporated by reference.

2. Description of the Related Art

Conventionally, a method for displaying a color video by spatially modulating each of red color light, green color light, and blue color light and by synthesizing them is known. FIG. 11 is a schematic block diagram showing an example of circuit configurations of a conventional spatial modulating-type video display device as disclosed in, for example, Japanese Patent Application Laid-open No. Hei 10-269802.

The conventional video display device chiefly includes a red color light source 111, a green color light source 112, a blue color light source 113, spatial light modulators 116, 117, and 118, an image synthesis optical system 119, a red color light source driving circuit 121, a green color light source driving circuit 122, a blue color light source driving circuit 123, a red spatial light modulator driving circuit 131, a green spatial light modulator driving circuit 132, a blue spatial light modulator driving circuit 133, a red image memory 151, a green image memory 152, a blue image memory 153, a video signal processing circuit 154, and a timing control circuit 161.

First, operations of optical systems in the conventional video display device are described by referring to FIG. 11. The spatial light modulator 116 for the red color performs spatial light modulation on red color light being incident from the red color light source 111 and emits red color image light, The spatial light modulator 117 for the green color performs spatial light modulation on green color light being incident from the green color light source 112 and emits green color image light. The spatial light modulator 118 for the blue color performs spatial light modulation on blue light being incident from the blue color light source 113 and emits blue color image light. The image synthesis optical system 119 performs image synthesis on the incident red color image light, the incident green color image light, and the incident blue image color light and emits synthesized image light. The emitted synthesized image light is projected through a projection optical system (not shown) onto a screen (not shown).

Next, configurations of circuits of the conventional video display device are explained by referring to FIG. 11. Each of the red color light source driving circuit 121, the green color light source driving circuit 122, and the blue color light source driving circuit 123 drives each of the red color light source 111, the green color light source 112, and the blue color light source 113. Each of the red spatial light modulator driving circuit 131, the green spatial light modulator driving circuit 132, and the blue spatial light modulator driving circuit 133 drives each of the spatial light modulators 116, 117, and 118, according to a video signal for a red color, for a green color, and for a blue color, respectively.

The timing control circuit 161 controls operational timing of each of the video signal processing circuit 154, the red spatial light modulator driving circuit 131, the green spatial light modulator driving circuit 132, and the blue spatial light modulator driving circuit 133 according to an input video signal 101.

The video signal processing circuit 154 performs video signal processing such as sync detection, color space conversion, degamma correction, or a like on the input video signal 101 and produces a video signal for each of the red color, the green color, and the blue color. Moreover, the video signal processing circuit 154 accumulates the produced video signals for the red, the green and the blue colors in the red image memory 151, the green image memory 152, and the blue image memory 153, respectively, and reads these signals from these memories, the red image memory 151, the green image memory 152, and the blue image memory 153.

FIG. 12 shows control timing for each component in the conventional video display device. Each of the red color light source 111, the green color light source 112, and the blue color light source 113 ordinarily is put in a driven and light-emitted state. Each of video signals to drive each of the spatial light modulators 116, 117, and 118 is renewed in every frame period. A video signal for a red color drives the spatial light modulator 116 for a red color. A video signal for a green color drives the spatial light modulator 117 for a green color. A video signal for a blue color drives the spatial light modulator 118 for a blue color.

Next, a conventional method for making image brighter in a conventional video display device is described. Conventionally, in order to display a color video, a method is employed in which each pixel making up a screen is divided into sub-pixels each producing each of three primary colors consisting of red (R), green (G), and blue (B) colors so that brightness in each of the sub-pixels is controlled and so that images produced by the sub-pixels is recognized visually as a color image. However, in terms of the brightness, if a screen is not sufficiently bright in a viewing environment, the image is difficult to see clearly. To solve this problem, a method is proposed in which the brightness is given to an entire image by adding a white color (W) as a color component to obtain a more vivid color video.

As an example of the video display device employing such the method as described above, a liquid crystal display device serving as a direct-view-type video display device is disclosed in, for example, Japanese Patent Application Laid-open No. 2002-149116, in which a screen that can provide proper luminance can be displayed by incorporating a sub-pixel for a white color (w), in addition to sub-pixels for red (R), green (G), and blue (B) colors, all making up each pixel in a liquid crystal panel, by calculating output luminance data for the white color from input data for the R, the G, and the B colors using a decoder, and by simultaneously driving all the sub-pixels for each of the red (R), the green (G), the blue (B), and the white (W) colors using the obtained luminance data together with the input data for the R, the G, and the B colors.

In the case of a projector to project a color video onto a screen, a color-sequence-method is generally employed in which, by sequentially applying light of three colors of red (R), green (G), and blue (B) colors to a spatial light modulator in which transmittance or reflectance is controlled spatially according to a video signal, an image of each color to be projected through the spatial light modulator onto the screen is recognized as a color video in a visually mixed state.

Human eyes have a capability of integration with a time constant of being several tens of milliseconds and, since a frame period during which an image consisting of red video light, green video light, and blue video light, all being emitted from the spatial light modulator, is switched, that is, a frame period of a video signal is ordinarily shorter than integral time constant of human eyes, when an image having a color being different in every frame period, while being sequentially switched according to a lapse of time, is projected, the human eyes recognize the image as a color image.

Next, configurations of a conventional color-sequence-type and spatial light modulating type are described. FIG. 13 is a schematic block diagram showing configurations of an optical system in the conventional color-sequence-type video display device as disclosed in, for example, Japanese Patent Application Laid-open No. Hei 10-269802.

The optical system of the above conventional color-sequence-type video display device chiefly includes a light source section 100, being made up of a red color light source 111, a green color light source 112, and a blue color light source 113, and an image synthesis optical system 115, and a spatial light modulator 130.

As shown in FIG. 13, the red color light source 111 emits red color light. The green color light source 112 emits green color light. The blue color light source 113 emits blue color light. The image synthesis optical system 115 synthesizes the red color light incident from the red light source 111, the green color light incident from the green light source 112, and the blue color light incident from the-blue light source 113 and sequentially emits the light to a same optical path. The spatial light modulator 130 performs spatial light modulation on the light emitted from the image synthesis optical system 115 sequentially and outputs the light.

The color synthesis optical system 15 to perform synthesis of red color light, green color light, and blue color light fed from each of the light sources can be made up of a dichroic prism, a dichroic mirror, polarization unifying units, fly-eye lens or a like. To reduce shading of light to be applied to the spatial light modulator 30, an optical integrator may be employed.

An example of a color synthesis optical system using a dichroic prism is disclosed in, for example, Japanese Patent Application Laid-open No. 2000-56410. An example of a color synthesis optical system using a dichroic mirror is disclosed in, for example, Japanese Patent Application Laid-open No. Hei 8-240779. An example of a color synthesis optical system using a fly-eye lens is disclosed in, for example, Japanese Patent Application Laid-open No. Hei 11-2278 and Japanese Patent Application Laid-open No. 2001-343706. An example of a color synthesis optical system having a configuration to reduce shading of light by using an optical integrator is disclosed in, for example, for example, Japanese Patent Application Laid-open No. Hei 10-269802. Moreover, the polarization unifying unit can be realized by such a method as disclosed in Japanese Patent Application Laid-open No. Hei 6-289387.

In the video display device shown in FIG. 13, the red color light, the green color light, and the blue color light emitted from the red color light source 111, the green color light source 112, and the blue color light source 113 are synthesized by the image synthesis optical system 115 and the synthesized color light is emitted to a same optical path. In the spatial light modulator 130, transmittance of light is spatially controlled according to a spatial light modulator driving signal and light incident from the image synthesis optical system 115 is spatially modulated sequentially and is emitted. Thus, red image light, green image light, and blue image light emitted from the spatial light modulator 130 are sequentially projected through a projection optical system (not shown) onto a screen and forms a color image.

Next, operations of controlling a light source for each color in the conventional video display device shown in FIG. 13 is described. The spatial light modulator driving signal is fed to the spatial light modulator 130. The spatial light modulator driving signals, as shown in FIG. 14, include a video signal for a red color (R-video), a video signal for a green color (G-video), and a video signal for a blue color (B-video), which are sequentially input to the spatial light modulator 130.

While the video signal for the red color is being fed to the spatial light modulator 130, red color light is input to the image synthesis optical system 115. While the video signal for the green color is being fed to the spatial light modulator 130, green color light is input to the image synthesis optical system 115. While the video signal for the blue color is being fed to the spatial light modulator 130, the blue color light is input to the image synthesis optical system 115. Since each of the red color light, the green color light and the blue color light is sequentially input through the image synthesis optical system 115 to the spatial light modulator 130, red color image light, green color image light, and blue color image light are sequentially emitted as image light from the spatial light modulator 130, projected onto the screen and recognized as a color video.

In the case of the color-sequence-type video display device, by adding a white (W) color as a color component to give brightness to an entire image, it is possible to obtain a more visible color image. A conventional color-sequence-type video display device is already provided in which brightness is given to an entire image by adding time required for applying white color light to sequence of applying each of the R, the G, and the B color light to the spatial light modulator, as disclosed in, for example, Japanese Patent Application Laid-open No. Hei 11-102170, Japanese Patent Application Laid-open No. 2001-184037, and Japanese Patent Application Laid-open No. 2002-82652.

In the above conventional video display devices, there are two methods of producing each of the R, the G, the B, and the W color light to be applied to the spatial light modulator. According to one method, each of the R, the G, the B, and the W color light is produced by using a rotary-type color filter plate (color wheel) which can emit each of the R, the G, and the B color light in its filter region for each of the R, the G, and the B colors and by introducing a region for the W color among filter regions for the R, the G, and the B colors to emit the W color light. According to another method, each of the R, the C, the S, and the W color light is produced by using three kinds of optical devices (for example, liquid crystal color filters) each corresponding to each of the R, the G, and the B colors to emit each of the R, the G, and the B color light in every allocated period and by using an optical device which can emit the W color light or by introducing a period during which the W color light is emitted after having transmitted through each of the three kinds of optical devices corresponding to the R, the G, and the B colors.

As a video display device having been conventionally used, a CRT (Cathode Ray Tube) is known. In the CRT, a phosphor is excited by an electron beam emitted from an electron gun, and thus red color light, green color light, and blue color light are emitted from the phosphor in an excited state. At this point, luminance on a surface of the phosphor is controlled so as to be approximately proportional to current density of the electron beam and so that current density of an electron beam is proportional to a tone component of a video signal.

Three primary colors to be provided by the CRT consist of colors emitted from each phosphor for each of the three colors and colors are reproduced by performing an additive color mixture process on each of the emitted colors at a rate corresponding to a video signal. Specifications of colorimetry for color reproductivity of a CRT are designated by ITU (International Telecommunication Union Radiocommunication Sector)-R Rec. BT. 1361 and, when a video signal defined by specifications of colorimetry is projected by the CRT, a color video of an expected color is reproduced. However, in the case of a video display device in which each of the three primary colors has different chromaticity coordinates, a tint of a video (picture) becomes different.

Also, in the case of a video display device to display a video by spatially modulating light fed from each of red, green, and blue light sources, a semiconductor light emitting device or a like is used as a light source. However, since a light emitting principle of a semiconductor light emitting device is different from that of a CRT, it is difficult to make chromaticity coordinates of each of the three primary colors be exactly the same as designated by specifications in the ITU-R Rec. BT. 1361 described above and, therefore, the color reproductivity is different from that of the CRT. To solve this problem, conventionally, a method for calibrating colors is employed in which balance of brightness of light from a light source for each of the three primary colors (R, G, B) is simply adjusted so that a white point satisfies the specifications.

However, though this method can make tint the same regarding a white point, it is difficult to correct color reproductivity of a color having high excitation purity, that is, a vivid color. Thus, the conventional video display device employing the semiconductor light emitting device has a problem in that its color reproductivity is not sufficient.

Furthermore, the conventional color-sequence-type video display device has also a problem in that, in addition to a period for applying each of R, G, and B color light, an additional period for applying W color light is prepared separately. However, control on a spatial light modulator using a video signal for a white color during a period of applying W color light is required, which causes complicated circuits and impairs high-speed operations.

SUMMARY OF THE INVENTION

In view of the above, it is an object of the present invention to provide a video display device to display a video by modulating light fed from each of light sources for each of three primary colors (R, G, and B) which is capable of providing excellent color reproductivity even when a light source is used in which chromaticity coordinates of each of its three primary colors (R, G, and B) are different from those designated by specifications of colorimetry by which a video signal is defined. It is another object of the present invention to provide a video display device being capable of adjusting color reproductivity according to specifications of colorimetry by which a video signal is defined. It is still another object of the present invention to provide a video display device to display a video by switching, in terms of time, red color light, green color light, and blue color light which is capable of enhancing brightness of an image by additionally applying white color light without causing complicated circuits.

According to a first aspect of the present invention, there is provided a video display device including:

a red color light source to emit red color light;
a green color light source to emit green color light;
a blue color light source to emit blue color light;
at least one spatial light modulator to spatially modulate, according to a video signal for a red color, a video signal for a green color, and a video signal for a blue color, the light fed from the red color light source, the light fed from the green color light source, and the light fed from the blue color light source;
a selection controller to select a combination of a video signal for controlling the spatial light modulator and the light to be modulated; and
a light quantity controller to control a time mean value of luminous flux of light to be modulated by the spatial light modulator.

In the foregoing first aspect, a preferable mode is one wherein, in the spatial light modulator, following equations hold among chromaticity coordinates $(xr0, yr0)$, $(xg0, yg0)$, and $(xb0, yb0)$ for light of a red color, a green color, and a blue color in specifications of colorimetry by which a video signal is defined according to CIE (Commision Internationale de l'Eclairage) 1931 standard colorimetric system, a time mean value of luminous flux of each of the red color, the green color, and the blue color, and chromaticity coordinates of the red color light, the green color light, and the blue color light defined in the standard colorimetric system; the following equations including:

$$xr0=(xr \times Lrr/yr + xg \times Lrg/yg + xb \times Lrb/yb)/(Lrr/yr + Lrg/yg + Lrb/yb)$$

$$yr0=(Lrr + Lrg + Lrb)/(Lrr/yr + Lrg/yg + Lrb/yb)$$

$$xg0=(xr \times Lgr/yr + xg \times Lgg/yg + xb \times Lgb/yb)/(Lgr/yr + Lgg/yg + Lgb/yb)$$

$$yg0=(Lgr + Lgg + Lgb)/(Lgr/yr + Lgg/yg + Lgb/yb)$$

$$xb0(xr \times Lbr/yr + xg \times Lbg/yg + xb \times Lbb/yb)/(Lbr/yr + Lbg/yg + Lbb/yb)$$

$$yb0=(Lbr + Lbg + Lbb)/(Lbr/yr + Lbg/yg + Lbb/yb)$$

wherein:
the Lrr represents a time mean value of luminous flux of red color light to be modulated according to a video signal for a red color,
the Lgr represents a time mean value of luminous flux of red color light to be modulated according to a video signal for a green color,
the Lbr represents a time mean value of luminous flux of red color light to be modulated according to a video signal for a blue color,
the Lrg represents a time mean value of luminous flux of green color light to be modulated according to a video signal for a red color,
the Lgg represents a time mean value of luminous flux of green color light to be modulated according to a video signal for a green color,
the Lbg represents a time mean value of luminous flux of green color light to be modulated according to a video signal for a blue color,
the Lrb represents a time mean value of luminous flux of blue color light to be modulated according to a video signal for a red color, the Lgb represents a time mean value of luminous flux of blue color light to be modulated according to a video signal for a green color, the Lbb represents a time mean value of luminous flux of blue color light to be modulated according to a video signal for a blue color, dsid (xr, yr), the (xg, yg), and the (xb, yb) represent chromaticity coordinates of the red color light, the green color light, and the blue color light, respectively, according to the standard colorimetric system.

Another preferable mode is one wherein following equations hold between chromaticity of coordinates (xr0, yr0), (xg0, yg0), and (xb0, yb0) of light of, respectively, red, green, and blue colors in specifications of colorimetry by which a video signal is defined according to the standard colorimetric system and chromaticity coordinates (xw, yw) of light of a standard white color in specifications of colorimetry by which a video signal is defined according to CIE (Commision Internationale de l'Eclairage) 1931 standard colorimetric system:

$$xw=(xr0\times Lr/yr0+xg0\times Lg/yg0+xb0\times Lb/yb0)/(Lr/yr0+Lg/yg0+Lb/yb0)$$

$$yw=(Lr+Lg+Lb)/(Lr/yr0+Lg/yg0+Lb/yb0)$$

wherein:
the Lr is defined to be Lrr+Lrg+Lrb,
the Lg is defined to be Lgr+Lgg+Lgb, and
the Lb is defined to be Lbr+Lbg+Lbb.

Still another preferable mode is one wherein, in the spatial light modulator, following equations hold between chromaticity coordinates (xr, yr), (xg, yg), and (xb, yb) of, respectively, red color light, green color light, and blue color light according to the CIE (Commision Internationale de l'Eclairage) 1931 standard colorimetric system and chromaticity coordinates (xw, yw) of a standard white color in specifications of colorimetry by which a video signal is defined as:

$$xw=(xr1\times Lr/yr1+xg1\times Lg/yg1+xb1\times Lb/yb1)/(Lr/yr1+Lg/yg1+Lb/yb1)$$

$$yw=(Lr+Lg+Lb)/(Lr/yr1+Lg/yg1+Lb/yb1)$$

wherein:
the Lrr represents a time mean value of luminous flux of red color light to be modulated according to a video signal for a red color, the Lgr represents a time mean value of luminous flux of red color light to be modulated according to a video signal for a green color, the Lbr represents a time mean value of luminous flux of red color light to be modulated according to a video signal for a blue color, the Lrg represents a time mean value of luminous flux of green color light to be modulated according to a video signal for a red color, the Lgg represents a time mean value of luminous flux of green color light to be modulated according to a video signal for a green color, the Lbg represents a time mean value of luminous flux of green color light to be modulated according to a video signal for a blue color, the Lrb represents a time mean value of luminous flux of blue color light to be modulated according to a video signal for a red color, the Lgb represents a time mean value of luminous flux of blue color light to be modulated according to a video signal for a green color, the Lbb represents a time mean value of luminous flux of blue color light to be modulated according to a video signal for a blue color, and wherein:
the Lr is defined to be Lrr+Lrg+Lrb,
the Lg is defined to be Lgr+Lgg+Lgb,
the Lb is defined to be Lbr+Lbg+Lbb,
the xr1 is defined to be (xr×Lrr/yr+xg×Lrg/yg+xb×Lrb/yb)/(Lrr/yr+Lrg/yg+Lrb/yb),
the yr1 is defined to be (Lrr+Lrg+Lrb)/(Lrr/yr+Lrg/yg+Lrb/yb),
the xg1 is defined to be (xr×Lgr/yr+xg×Lgg/yg+xb×Lgb/yb)/(Lgr/yr+Lgg/yg+Lgb/yb)
the yg1 is defined to be (Lgr+Lgg+Lgb)/(Lgr/yr+Lgg/yg+Lgb/yb)
the xb1 is defined to be (xr×Lbr/yr+xg×Lbg/yg+xb×Lbb/yb)/(Lbr/yr+Lbg/yg+Lbb/yb) and
the yb1 is defined to be (Lbr+Lbg+Lbb)/(Lbr/yr+Lbg/yg+Lbb/yb)

An additional preferable mode is one wherein following expressions hold:

$$Prr=Pgr=Pbr$$

$$Prg=Pgg=Pbg$$

$$Prb=Pgb=Pbb$$

wherein:
The Prr, the Pgr, and the Pbr represent luminous flux of red color light to be modulated according to a video signal for a red color, a video signal for a green color, and a video signal for a blue color, respectively, The Prg, the Pgg, and the Pbg represent luminous flux of green color light to be modulated according to a video signal for a red color, a video signal for a green color, and a video signal for a blue color, respectively, and The Prb, the Pgb, and the Pbb represent luminous flux of blue color light to be modulated according to a video signal for a red color, a video signal for a green color, and a video signal for a blue color, respectively.

Another preferable mode is one wherein a period is provided during which all light sources for each color are turned OFF during one frame period.

A further preferable mode is one wherein a light source for the red color light, the green color light, the blue color light, or the white color light includes a light emitting diode.

An additional preferable mode is one wherein the light source for the red color light, the green color light, the blue color light, or the white color light includes a plurality of the light emitting diodes.

According to a second aspect of the present invention, there is provided a video display device including:

a light applying unit to adjust luminous flux of each of a red color light, a green color light, and a blue color light and to switch the red color light, the green color light, and the blue color light in terms of time and to sequentially emit the red color light, the green color light, and the blue color light;

a spatial light modulator to spatially modulate light fed from the light applying unit; and wherein the light applying unit is controlled so that, when luminous flux of the red color light being emitted while the spatial light modulator is driven according to a video signal for a red color is expressed as Pr, when luminous flux of the green color light being emitted while the spatial light modulator is driven according to a video signal for a green color is expressed as Pg, and when luminous flux of the blue color light being emitted while the spatial light modulator is driven according to a video signal for a blue color is expressed as Pb, both the green color light having luminous flux of K×Pg (k being a coefficient and $0 \leq K \leq 1$ same as above) and the blue color light having luminous flux of K×Pb together with the red color light are applied when the spatial light modulator is driven according to the video signal for a red color, both the blue color light having luminous flux of K×Pb and the red color light having luminous flux of K×Pr together with the green color light are applied when the spatial light modulator is driven according to the video signal for a green color and both the red color light having luminous flux of K×Pr, and the green color light having luminous flux of K×Pg together with the blue color light are applied when the spatial light modulator is driven according to the video signal for a blue color.

In the foregoing second aspect, a preferable mode is one wherein, in the light applying unit, a value of the coefficient k is configured to be able to be changed.

According to a third aspect of the present invention, there is provided a color-sequence-type video display device including:

a light applying unit to adjust luminous flux of each of red color light, green color light, and blue color light and to switch the red color light, the green color light, and the blue color light in terms of time and to sequentially emit the red color light, the green color light, and the blue color light;

a spatial light modulator to spatially modulate light fed from the light applying unit; and wherein the light applying unit is controlled so that red color light and white color light are applied to the spatial light modulator while the spatial light modulator is driven according to a video signal for a red color, a green color light and a white color light are applied to the spatial light modulator while the spatial light modulator is driven according to a video signal for a green color, and a blue color light and a white color light are applied to the spatial light modulator while the spatial light modulator is driven according to a video signal for a blue color.

In the foregoing third aspect, a preferable mode is one wherein the white color light is applied to the spatial light modulator according to driving timing for the spatial light modulator by the video signal for a red color, the video signal for a green color, and the video signal for a blue color.

Another preferable mode is one wherein the white color light is being lighted all the time.

Still another preferable mode is one wherein brightness of the white color light is configured to be able to be changed by external control.

With the above configurations, since a color image is obtained by controlling a time mean value of luminous flux of image light of each color acquired through spatial light modulation performed by the spatial light modulating unit for each of the red color, the green color, and the blue color according to a video signal and by synthesizing each of the red color, the green color, and the blue color, desired color reproductivity can be achieved, irrespective of chromaticity coordinates, by setting chromaticity coordinates of each of the red color, the green color, and the blue color and of a white color. Therefore, even when a light source is used which emits light having chromaticity coordinates of each of the red color, the green color, and the blue color being different from those designated by specifications of colorimetry by which a video signal is defined, substantial color reproductivity of the red color, the green color, the blue color, and the white color can be improved.

With another configuration, since a light applying unit being able to adjust luminous flux of each of red color light, green color light, and blue color light and the spatial light modulating unit being able to modulate light fed from the light applying unit are placed and, when the spatial light modulating unit is controlled according to a video signal for a red color, not only the red color light but also the green color light and the blue color light are applied to the spatial light modulating unit and, similarly, when the spatial light modulating unit is controlled according to a video signal for the green color light, not only green color light but also the blue color light and the red color light are applied to the spatial light modulating unit and, when the spatial light modulating unit is controlled according to the video signal for a blue color, not only the blue color light but also the red color light and the green color light are applied to the spatial light modulating unit, brightness of a video can be enhanced. Moreover, since the light applying unit has a function of adjusting brightness of color light, it is possible to calibrate a degree of brightness of color light depending on contents of an image source and/or on a viewing environment.

With still another configuration, since the light applying unit being able to calibrate luminous flux of each of the red color light, the green color light, the blue color light, and the white color light and the spatial light modulating unit being able to modulate light fed from the light applying unit are placed and, when the spatial light modulating unit is controlled according to a video signal for a red color, not only the red color light but also the white color light is applied to the spatial light modulating unit and, similarly, when the spatial light modulating unit is controlled according to a video signal for a green color, not only the green color light but also the white color light is applied to the spatial light modulating unit and, when the spatial light modulating unit is controlled according to a video signal for a blue color, not only the blue color light but also the white color light is applied to the spatial light modulating unit; therefore brightness of a video can be well controlled.

BRIEF DESCRIPTION OF THE DRAWINGS

The above and other objects, advantages, and features of the present invention will be more apparent from the following description taken in conjunction with the accompanying drawings in which.

DETAILED DESCRIPTION OF THE PREFERRED EMBODIMENTS

Best modes of carrying out the present invention will be described in further detail using various embodiments with reference to the accompanying drawings.

In a video display device of the present invention, a color image is obtained by controlling a time mean value of luminous flux of color light and by synthesizing image light of each of three primary colors (red, green, and blue) obtained through spatial light modulation performed according to a video signal by each of spatial light modulating units each corresponding to each of the three primary colors (red, green, and blue). Moreover, brightness is enhanced by introducing color light applying units to adjust luminous flux of light of each of the three primary colors (red, green, and blue) and spatial light modulating units to modulate light fed from the color light applying units and, when the spatial light modulating units are controlled according to a video signal for each of the colors, by applying not only light of the color for the video signal but also light of other two colors out of the three primary colors (red, green, and blue). Furthermore, in addition to the light of other two colors, white color light is also applied.

First Embodiment

Figure 1:
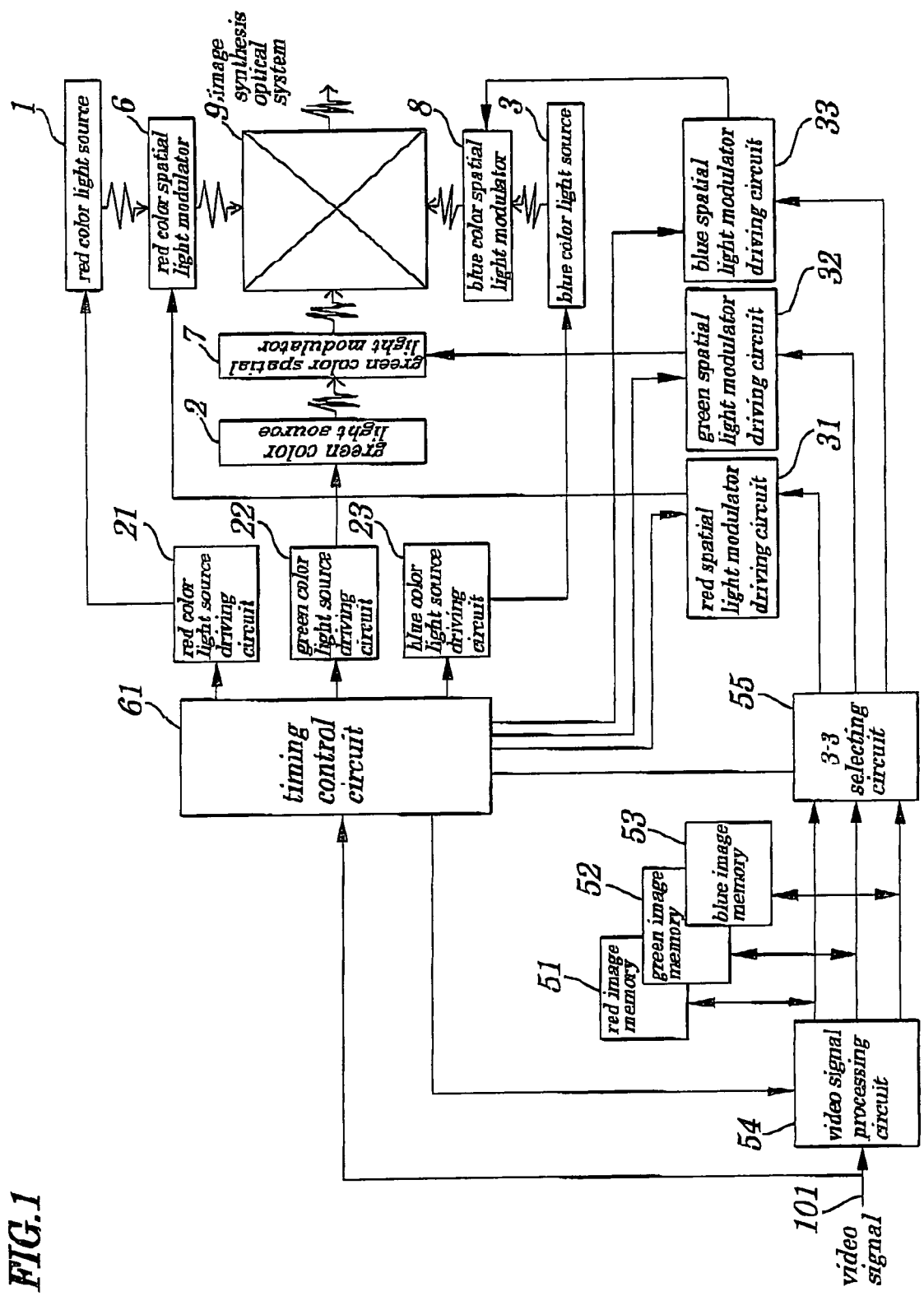
FIG. 1 is a schematic block diagram showing configurations of a video display device according to a first embodiment of the present invention.
Figure 2:
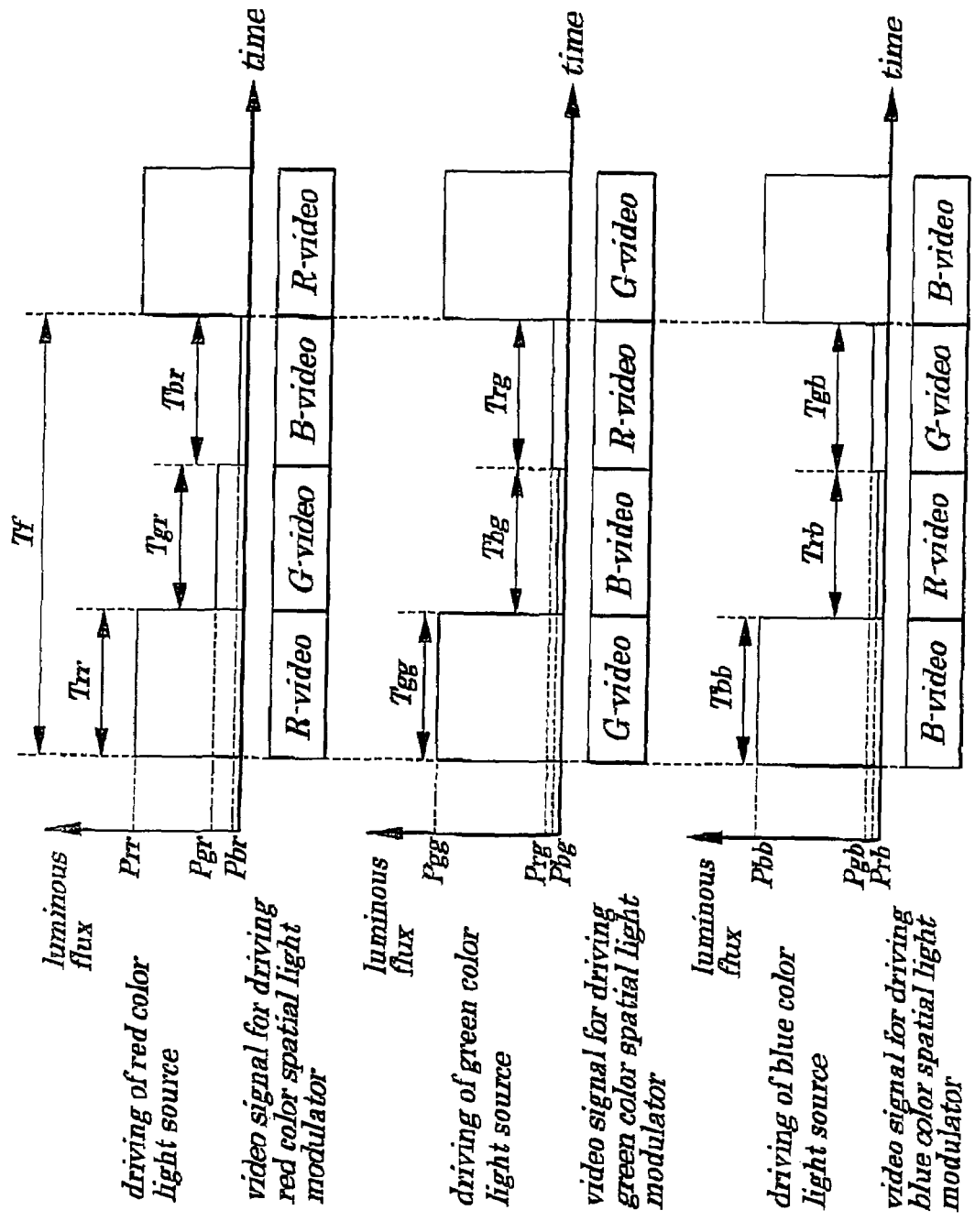
FIG. 2 is a timing chart showing a method for controlling a light source for each color employed in the video display device of the first embodiment of the present invention.
Figure 3:
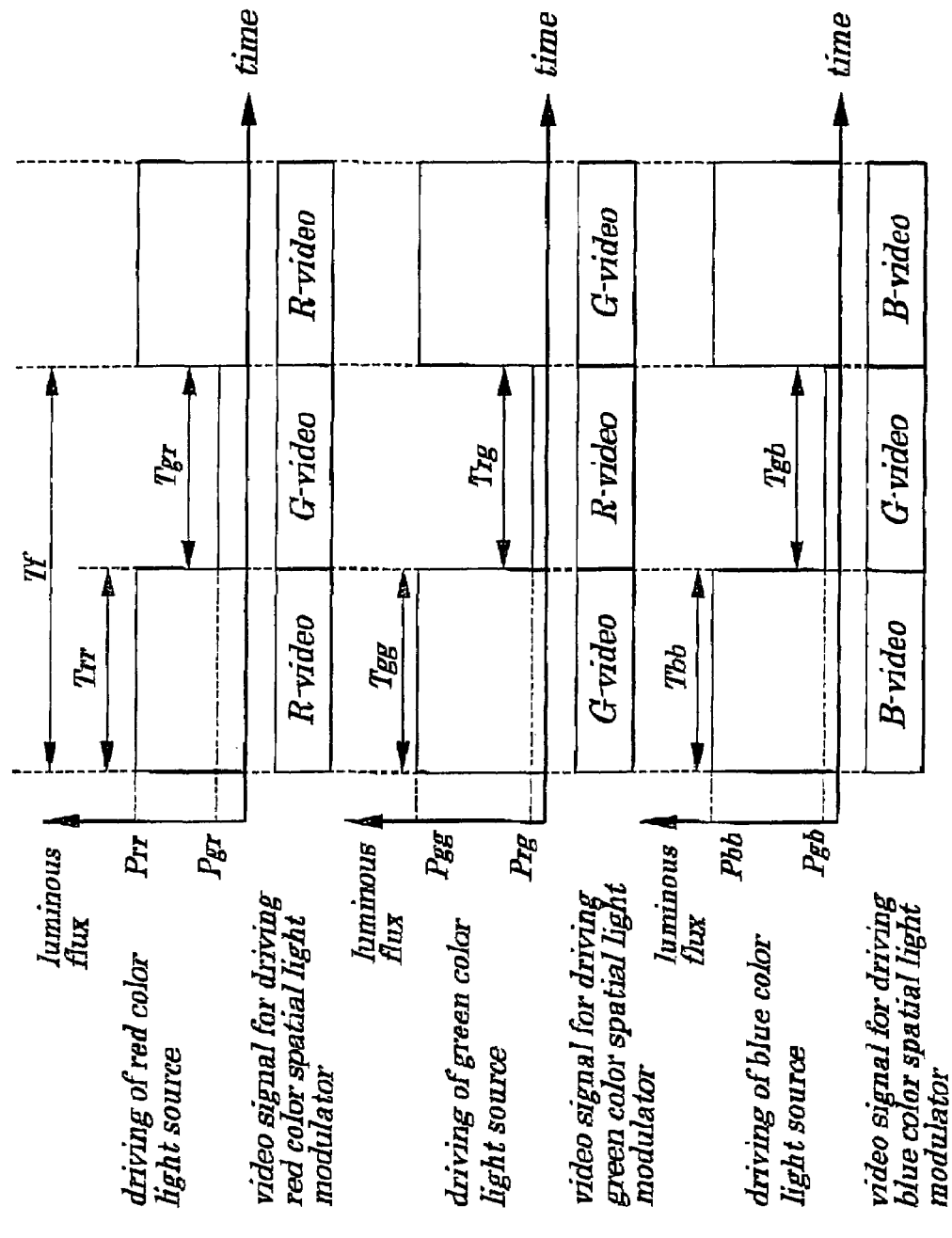
FIG. 3 is also a timing chart showing another method for controlling the light source for each color employed in the video display device of the first embodiment of the present invention.

FIG. 1 is a schematic block diagram showing configurations of a video display device according to a first embodiment of the present invention. FIG. 2 is a timing chart showing a method for controlling a light source for each color employed in the video display device of the first embodiment. FIG. 3 is also a timing chart showing another method for controlling the light source for each color employed in the video display device of the first embodiment.

The video display device of the first embodiment, as shown in FIG. 1, chiefly includes a red color light source 1, a green color light source 2, a blue color light source 3, a red color spatial light modulator 6, a green color spatial light modulator 7, a blue color spatial light modulator 8, an image synthesis optical system 9, a red color light source driving circuit 21, a green color light source driving circuit 22, a blue color light source driving circuit 23, a red spatial light modulator driving circuit 31, a green spatial light modulator driving circuit 32, a blue spatial light modulator driving circuit 33, a red image memory 51, a green image memory 52, a blue image memory 53, a video signal processing circuit 54, a 3-3 selecting circuit (RGB simultaneously selecting circuit) 55, and a timing control circuit 61.

First, configurations of optical systems employed in the video display device of the embodiment are described. The red color light source 1, the green color light source 2, and the blue color light source 3 emit single red color light, single green color light, and single blue color light, respectively. It is preferable that LEDs (Light Emitting Diodes) are used as the red color light source 1, the green color light source 2, and the blue color light source 3, each of which can produce the single red color light, the single green color light, and the single blue color light and can control luminous flux by a current value to be applied to each of the LEDs. Since response time of each of the LEDs is as short as several microseconds or less which is sufficiently shorter than a frame period of an image to be displayed, as described below, control on the light source is made possible. Moreover, if the LED is used as the light source for the video display device of the embodiment, since quantity of light of one piece of the LED is not enough, a plurality of the LEDs is preferably used to produce each color light.

Each of the red color spatial light modulator 6, the green color spatial light modulator 7, and the blue color spatial light modulator 8 is used to change optical transmittance in each portion in space having a specified size so as to match an image and each of the spatial light modulators 6, 7, and 8 is made up of a TN (Twisted Nematic)—type liquid crystal panel, ferroelectric liquid crystal panel, DMD (Digital Micro-mirror Device), or a like. In the case of the TN liquid crystal panel, properties of an optically transmissive substance such as rotary polarization (optical rotation), double refraction (birefringence), and a like are utilized and intensity of light to be transmitted through the TN liquid crystal panel can be changed by controlling a degree of polarization according to an applied voltage value.

In the case of the ferroelectric liquid crystal panel, property of double refraction is utilized and its two polarized states are switched according to a polarity of an applied voltage and brightness of light to be transmitted through the ferroelectric liquid crystal panel is controlled by a PWM (Pulse Width Modulation) method.

Two types of each of the TN liquid crystal panel and the ferroelectric liquid crystal panel are available, one being of a transmissive type and another being of a reflection type. The DMD has only one type which is of a reflection type. In the case of the spatial light modulator employing the transmissive-type liquid crystal panel, a polarizer is placed both on a light-incident side and on a light-outgoing side in the liquid crystal panel. In the case of the spatial light modulator employing a reflection-type liquid crystal panel, a PBS (Polarizing Beam Splitter) is mounted on a light-incident and light-outgoing side in the liquid crystal panel. The DMD employed in the embodiment is a reflective-type spatial light modulator. The DMD has micro-mirrors in numbers corresponding to a number of pixels and a tilt of the each of the micro-mirrors is switched depending on a polarity of a voltage to be applied. The tilt of micro-mirrors to be controlled is in two states (ON state and OFF state) and brightness of light passing through the micro-mirrors is controlled by the PWM method. That is, the longer a time for the ON state and the shorter a time for the OFF state, the brighter the light passing through the micro-mirrors and, therefore, the brightness can be controlled by adjusting time allotment for the ON and the OFF states. In some cases, in order to prevent contrast of light from being lowered due to leakage of light being in the OFF state contained in reflected light into a projection optical system, a total reflection prism is used.

The image synthesis optical system 9 is made up of a cross dichroic prism, dichroic mirror, or a like and outputs image light synthesized from red color image light, green color image light, and blue color image light. Moreover, if the DMD is used as the spatial light modulator, in some cases, a color separating prism/color combining prism and the total reflection prism are employed.

Next, operations of each circuit making up the video display device are described. The red color light source driving circuit 21, the green color light source driving circuit 22, and the blue color light source driving circuit 23 drive the red color light source 1, the green color light source 2, and the blue color light source 3, respectively, and control their light emitting states. The red spatial light modulator driving circuit 31, the green spatial light modulator driving circuit 32, and the blue spatial light modulator driving circuit 33 drive the red color spatial light modulator 6, the green color spatial light modulator 7, and the blue color spatial light modulator 8, respectively, according to a video signal for a red color, a video signal for a green color, and a video signal for a blue color being fed respectively from the 3-3 selecting circuit (RGB simultaneously selecting circuit) 55, and change light transmittance in each portion in space according to red images, green images, and blue images.

The timing control circuit 61, according to an input video signal 101, exerts control on operation timing of the red color light source driving circuit 21, the green color light source driving circuit 22, and the blue color light source driving circuit 23, the red spatial light modulator driving circuit 31, the green spatial light modulator driving circuit 32, and the blue spatial light modulator driving circuit 33, the video signal processing circuit 54, and the 3-3 selecting circuit 55, on an amount of driving power to be fed from the red color light source driving circuit 21, the green color light source driving circuit 22, and the blue color light source driving circuit 23, respectively, to the red color light source 1, the green color light source 2, and the blue color light source 3, on time of supplying the driving power, or on changing, if each of the color light sources is made up of a plurality of light emitting devices, a number of pieces of the light emitting devices used to cause the light emitting device for each color to be emitted. Moreover, the timing control circuit 61 may be so configured that control on an amount of the driving power, on time of supplying the driving power, and on change in the number of the light emitting devices may be exerted in combination with each other. Also, the timing control circuit 61 may be so configured that a specification of colorimetry by which the input video signal 101 is defined can be identified and the control can be switched according to the specification of colorimetry.

Each of the red image memory 51, the green image memory 52, and the blue image memory 53 temporarily stores a video signal for a red color, a video signal for a green color, and a video signal for a blue color. The video signal processing circuit 54, according to the input video signal 101, performs video signal processing such as sync detection, color space conversion, degamma processing, or a like and produces a video signal for a red color, a video signal for a green color, and a video signal for a blue color, and accumulates the produced video signals for red color, green color, and blue color in the red image memory 51, the green image memory 52, and the blue image memory 53, respectively, and controls outputting of data read from each of the red image memory 51, the green image memory 52, and the blue image memory 53 to the 3-3 selecting circuit 55.

The 3-3 selecting circuit (RGB simultaneously selecting circuit) 55 selects video signals for red color, green color, and blue color input from the red image memory 51, the green image memory 52, and the blue image memory 53, respectively, according to timing control by the timing control circuit 61 and outputs the selected video signals to the red spatial light modulator driving circuit 31, the green spatial light modulator driving circuit 32, and the blue spatial light modulator driving circuit 33, respectively.

Control and operations of the video display device of the first embodiment are described by referring to FIG. 1 to FIG. 3. red image light that the red spatial light modulator 6 emits by having performed the spatial light modulation on red light fed from the red color light source 1, green image light that the green spatial light modulator 7 emits by having performed the spatial light modulation on green light fed from the green color light source 2, and blue image light that the blue spatial light modulator 8 emits by having performed the spatial light modulation on blue light fed from the blue color light source 3 are fed to the image synthesis optical system 9. The image synthesis optical system 9 performs image synthesization from the red image light, the green image light, and the blue image light, and outputs the obtained image light, that is, the synthesized image light. The synthesized image light is projected by a projection optical system (not shown) onto a screen (not shown).

According to a first control method employed in the video display device of the embodiment, as shown in the timing chart in FIG. 2, the order of video signals for driving the red color spatial light modulator 6 during one frame period is a video signal for a red color, for a green color, and for a blue color, the order of the video signals for driving the green color spatial light modulator 7 during one frame period is a video signal for a green color, for a blue color and for a red color, and the order of the video signals for driving the blue color spatial light modulator 8 during one frame period is a video signal for a blue color, for a red color, and for a green color.

However, the order of the video signals to be input to each of the spatial light modulators 6, 7, and 8 is not limited to the orders in the example described above. That is, the order of the video signals for driving all the spatial light modulators 6, 7, and 8 during one frame period may be a video signal for a red color, for a green color, and for a blue color. In this case, there is an advantage in that a video signal output from the video signal processing circuit 54 can be of one type, however, a problem arises that occurrence of a bias in distribution on time base in colors of synthesized image light causes a phenomenon being so-called "color breakup" to occur easily. By employing the control method shown in FIG. 2, almost no color breakup shows.

Now, let it be assumed, as shown in FIG. 2, that one frame period is "Tf", that time during which red light is modulated by a video signal for a red color (R-video), a video signal for a green color (G-video), and a video signal for a blue color (B-video) during one frame period "Tf" in the red color spatial light modulator 6 is "Trr", "Tgr", and "Tbr", respectively, and that luminous flux of red color light being a result from the modulation corresponding to the time "Trr", "Tgr", and "Tbr" are "Prr", "Pgr", and "Pbr", respectively. Similarly, let it be assumed that one frame period is "Tf", that time during which green light is modulated by the video signal for a red color (R-video), the video signal for a green color (G-video), and the video signal for a blue color (B-video) during one frame period "Tf" in the green color spatial light modulator 7 is "Trg", "Tgg", and "Tbg", respectively, and that luminous flux of green color light being a result from the modulation corresponding to the time "Trg", "Tgg", and "Tbg" are "Prg", "Pgg", and "Pbg", respectively, Furthermore, let it be assumed that one frame period is "Tf", that time during which blue light is modulated by the video signal for a red color (R-video), the video signal for a green color (G-video), and the video signal for a blue color (B-video) during one frame period "Tf" in the blue color spatial light modulator 8 is "Trb", "Tgb", and "Tbb", respectively, and that luminous flux of blue color light being a result from the modulation corresponding to the time "Trb", "Tgb", and "Tbb" are "Prb", "Pgb", and "Pbb", respectively.

Now, Lrr, Lrg, Lrb, Lgr, Lgg, Lgb, Lbr, Lbg, and Lbb are defined by following equations:

$$Lrr = Prr \times Trr/Tf$$

$$Lrg = Prg \times Trg/Tf$$

$$Lrb = Prb \times Trb/Tf$$

$$Lgr = Pgr \times Tgr/Tf$$

$$Lgg = Pgg \times Tgg/Tf$$

$$Lgb = Pgb \times Tgb/Tf$$

$$Lbr = Pbr \times Tbr/Tf$$

$$Lbg = Pbg \times Tbg/Tf$$

$$Lbb = Pbb \times Tbb/Tf \quad \text{Equation (1)}$$

In this case, each of Lrr, Lrg, Lrb, Lgr, Lgg, Lgb, Lbr, Lbg, and Lbb represents a following amount.

Lrr: Time mean value of luminous flux of red color light to be modulated according to a video signal for a red color in the red color spatial light modulator 6.

Lgr: Time mean value of luminous flux of red color light to be modulated according to a video signal for a green color in the red color spatial light modulator 6.

Lbr: Time mean value of luminous flux of red color light to be modulated according to a video signal for a blue color in the red color spatial light modulator 6.

Lrg: Time mean value of luminous flux of green color light to be modulated according to a video signal for a red color in the green color spatial light modulator 7.

Lgg: Time mean value of luminous flux of green color light to be modulated according to a video signal for a green color in the green color spatial light modulator 7.

Lbg: Time mean value of luminous flux of green color light to be modulated according to a video signal for a blue color in the green color spatial light modulator 7.

Lrb: Time mean value of luminous flux of blue color light to be modulated according to a video signal for a red color in the blue color spatial light modulator 8.

Lgb: Time mean value of luminous flux of blue color light to be modulated according to a video signal for a green color in the blue color spatial light modulator 8.

Lbb: Time mean value of luminous flux of blue color light to be modulated according to a video signal for a blue color in the blue color spatial light modulator 8.

Moreover, Lr, Lg, and Lb are defined by following equations:

$$Lr = Lrr + Lrg + Lrb$$

$$Lg = Lgr + Lgg + Lgb$$

$$Lb = Lbr + Lbg + Lbb \quad \text{Equation (2)}$$

In this case, each of Lr, Lg, and Lb represents a following amount:

Lr: A sum of time mean value s of luminous flux of red color light, green color light, and blue color light to be modulated according to a video signal for a red color in the red color spatial light modulator 6, green color spatial light modulator 7, and blue color spatial light modulator 8, respectively.

Lg: A sum of time mean value s of luminous flux of red color light, green color light, and blue color light to be modulated according to a video signal for a green color in the red color spatial light modulator 6, green color spatial light modulator 7, and blue color spatial light modulator 8, respectively.

Lb: A sum of time mean value s of luminous flux of red color light, green color light, and blue color light to be modulated according to a video signal for a blue color in the red color spatial light modulator 6, green color spatial light modulator 7, and blue color spatial light modulator 8, respectively.

Human eyes have a capability of integration for light and therefore a result obtained by multiplying luminous flux of a light source by light emitting time shows substantial brightness of the light source. That is, Lrr, Lrg, Lrb, Lgr, Lgg, Lgb, Lbr, Lbg, Lbb, Lr, Lg, and Lb show substantial brightness in one frame period Tf. Adjustment of substantial brightness of a light source may be made by using power to be applied to the light source or by using time during which power is applied to the light source. Moreover, if each light source is made up of a plurality of light emitting devices, substantial brightness of the light source can be calibrated by changing a number of pieces of the light emitting devices used to cause the light emitting device to be emitted.

Moreover, as a method for expressing a color, generally, chromaticity coordinates in the CIE (Commission Internationale de l'Eclairage) 1931 standard colorimetric system ("so-called" "XYZ colorimetric system) is used.

When it is assumed that chromaticity coordinates of each color light fed from the red color light source 1, the green color light source 2, and the blue color light source 3 employed in the video display device of the embodiment according to the XYZ colorimetric system are (xr, yr), (xg, yg), and (xb, yb) and chromaticity coordinates of each of three primary colors (red, green, and blue) that are newly produced are (xr0, yr0), (xg0, yg0), and (xb0, yb0), following equations can be obtained approximately from relations between chromaticity coordinates in the XYZ colorimetric system and brightness related to photometric quantity:

$$xr0 = (xr \times Lrr/yr + xg \times Lrg/yg + xb \times Lrb/yb)/(Lrr/yr + Lrg/yg + Lrb/yb)$$

$$yr0 = (yr \times Lrr/yr + yg \times Lrg/yg + yb \times Lrb/yb)/(Lrr/yr + Lrg/yg + Lrb/yb) = (Lrr + Lrg + Lrb)/(Lrr/yr + Lrg/yg + Lrb/yb)$$

$$xg0 = (xr \times Lgr/yr + xg \times Lgg/yg + xb \times Lgb/yb)/(Lgr/yr + Lgg/yg + Lgb/yb)$$

$$yg0 = (yr \times Lgr/yr + yg \times Lgg/yg + yb \times Lgb/yb)/(Lgr/yr + Lgg/yg + Lgb/yb) = (Lgr + Lgg + Lgb)/(Lgr/yr + Lgg/yg + Lgb/yb)$$

$$xb0=(xr \times Lbr/yr+xg \times Lbg/yg+xb \times Lbb/yb)/(Lbr/yr+Lbg/yg+Lbb/yb)$$

$$yb0=(yr \times Lbr/yr+yg \times Lbg/yg+yb \times Lbb/yb)/(Lbr/yr+Lbg/yg+Lbb/yb)=(Lbr+Lbg+Lbb)/(Lbr/yr+Lbg/yg+Lbb/yb) \quad \text{Equation (3)}$$

Coordinates (xr0, yr0), (xg0, yg0), and (xb0, yb0) are determined by coordinates (xr, yr), (xg, yg), and (xb, yb) and brightness ratios (Lrr:Lrg:Lrb), (Lgr:Lgg:Lgb), and (Lbr:Lbg:Lbb) That is, when a light source emitting color light having chromaticity coordinates in the XYZ colorimetric system being (xr, yr), (xg, yg), and (xb, yb) is used, by adjusting ratios (Lrr:Lrg:Lrb), (Lgr:Lgg:Lgb), and (Lbr:Lbg:Lbb) of substantial brightness of light from the light source, three primary colors (red, green, and blue) having same chromaticity coordinates as three primary colors (red, green, and blue) obtained according to specifications of colorimetry defining the video signal can be produced. It is needless to say that three primary colors (red, green, and blue) each having desired chromaticity coordinates can be produced.

Moreover, when chromaticity coordinates of a white color point is (xw, yw), relations expressed by following equations can be derived from what is described above:

$$xw=(xr0 \times Lr/yr0+xg0 \times Lg/yg0+xb0 \times Lb/yb0)/(Lr/yr0+Lg/yg0+Lb/yb0)$$

$$yw=(yr0 \times Lr/yr0+yg0 \times Lg/yg0+yb0 \times Lb/yb0)/(Lr/yr0+Lg/yg0+Lb/yb0)=(Lr+Lg+Lb)/(Lr/yr0+Lg/yg0+Lb/yb0) \quad \text{Equation (4)}$$

Therefore, when three primary colors (red, green, and blue) each having chromaticity coordinates being (xr0, yr0), (xg0, yg0), and (xb0, yb0) are used, by adjusting ratios (Lr:Lg:Lb) of substantial brightness of light from the light source, a white color having same chromaticity coordinates as a standard white in specifications of colorimetry defining a video signal can be produced. It is needless to say that a white color having desired chromaticity coordinates can be produced. Thus, in the video display device of the embodiment, since three primary colors (red, green, and blue) having same chromaticity coordinates as three primary colors (red, green, and blue) in specifications of colorimetry defining a video signal to be input and a white color having same chromaticity coordinates as a standard white color can be produced, a tint of a video can be faithfully reproduced.

Concrete examples of calculation are shown below. Now, let it be assumed that a video signal to be input is defined by the ITU (International Telecommunication Union Radio-communication Sector)-R Rec. BT. 1361 specifications.

When a coefficient of a luminous equation in the ITU-R Rec. BT. 1361 specifications is taken into consideration, a following equation is given:

$$Lr/0.2126=Lg/0.7152=Lb/0.722 \quad \text{Equation (5)}$$

Chromaticity coordinates of each of the three primary colors (red, green, and blue) in the ITU-R Rec. BT. 1361 specifications are expressed by following equations:

(xr0, yr0)=(0.640, 0.330)

(xg0, yg0)=(0.300, 0.600)

(xb0, yb0)=(0.150, 0.060)     Equation (6)

Now, let it again be assumed that chromaticity coordinates of color light from the red color light source 1, from the green color light source 2, and from the blue color light source 3 are expressed, for example, by following equations:

(xr, yr)=(0.690, 0.300)

(xg, yg)=(0.290, 0.680)

(xb, yb)=(0.150, 0.060)     Equation (7)

By substitute the equations (5), (6), and (7) into the equation (3), following relational equations can be obtained:

$$Lrr/0.1707=Lrg/0.0410=Lrb/0.0009=Lgr/0.0207=Lgg/0.6878=Lgb/0.0067=Lbb/0.0722$$

$$Lbr=Lbg=0.0000 \quad \text{Equation (8)}$$

FIG. 3 is also a timing chart showing a second method for controlling the light sources for each color employed in the video display device of the first embodiment. In the example of calculation shown in the equation (8), "Lbr", "Lbg", and "Lrb" contribute little to color reproductivity. Therefore, by setting as Tbr=Tbg=Trb=0 as shown in FIG. 3, a number of processes may be reduced. This enables increased allotment time of "Lrr", "Lgg" and "Lbb" being main components which produces an effect that brightness can be further enhanced.

Moreover, in the example shown in FIG. 2, setting is done so that, approximately, Trr=Tgr=Tbr=Trg=Tgg=Tbg=Trb=Tgb=Tbb, however, as is understood from the equation (1), since all that is needed is that each of Prr×Trr, Prg×Trg, Prb×Trb, Pgr×Tgr, Pgg×Tgg, Pgb×Tgb, Pbr×Tbr, Pbg×Tbg, and Pbb×Tbb is constant, setting may be done so that, for example, Prr=Pgr=Pbr, Prg=Pgg=Pbg, and Prb=Pgb=Pbb, which makes constant power to be applied to each of the light sources. By operating as above, since power to be applied to each of the light sources becomes constant, influences caused by an individual difference in a luminous flux—applied power characteristic, a change in temperatures, a change with a passage of time, or a like in the light sources can be reduced, which enables a number of adjusting processes to be reduced and a change in a tint of a video caused by temperatures, a secular change, or a like to be prevented.

Moreover, in the example shown in FIG. 2, the light source for any one of the colors is being lit all the time, however, all the light sources may be turned OFF at a time when a frame period is switched or a like. By operating as above, an effect can be obtained in which degradation of moving picture quality caused by the human after-image effect can be avoided.

Thus, in the video display device of the embodiment, since a time mean value of luminous flux is controlled and since a color image synthesized from each color image light obtained by spatial light modulation performed, according to a video signal, by each of spatial light modulators for red, green, and blue colors is output, it is possible to achieve color reproductivity as desired, irrespective of chromaticity coordinates of light from each of the light sources, by setting chromaticity coordinates of each of the three colors and of a white color. Therefore, even when a light source is used in which chromaticity coordinates of light of each of its three primary colors (red, green, and blue) are different from those designated by specifications of colorimetry by which a video signal is defined, substantial reproductivity of three primary colors (red, green, and blue) can be improved.

Second Embodiment

Figure 4:
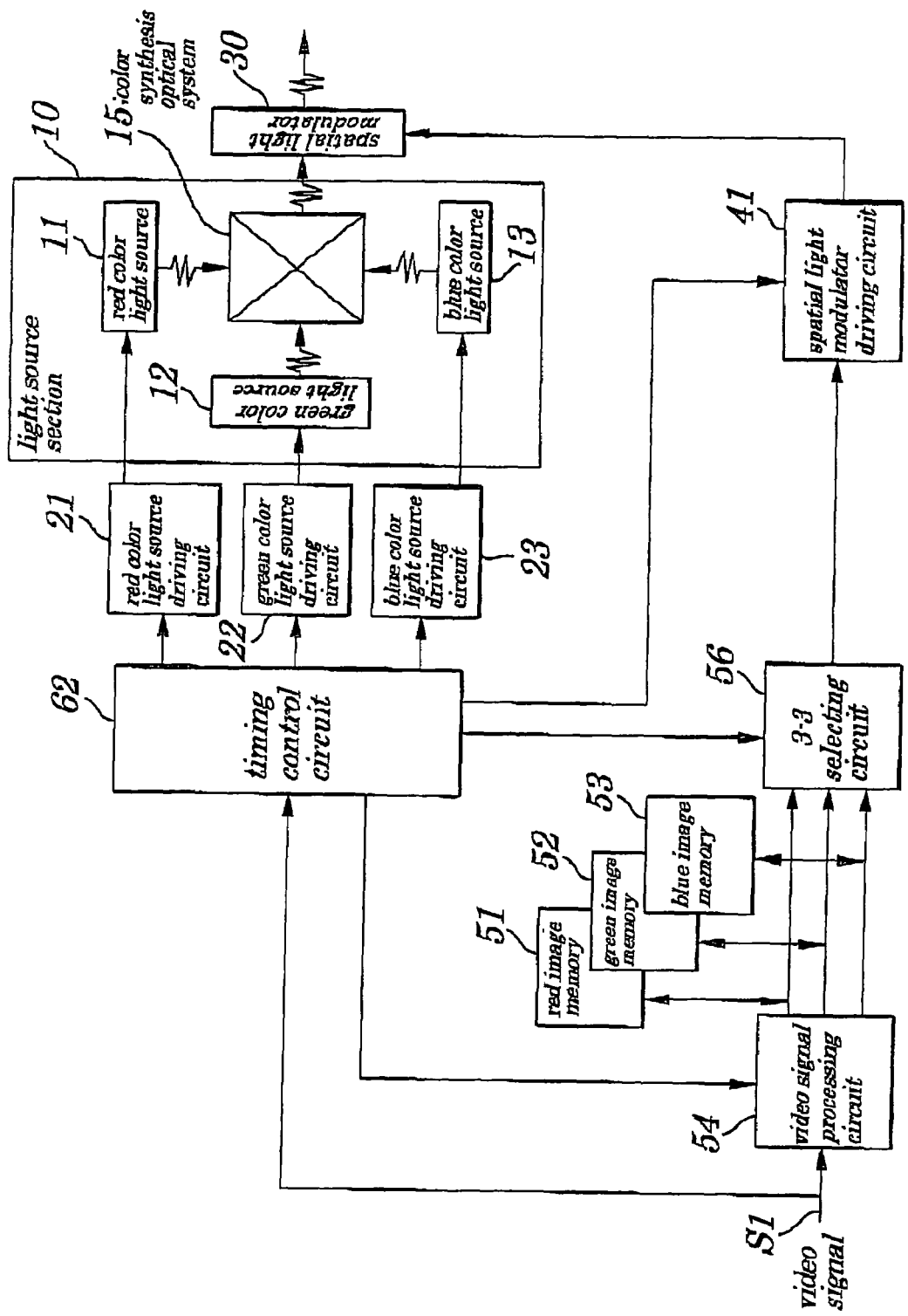
FIG. 4 is a schematic block diagram showing configurations of a video display device according to a second embodiment of the present invention.

FIG. 4 is a schematic block diagram showing configurations of a color-sequence-type video display device according to a second embodiment of the present invention. FIG.

Figure 6:
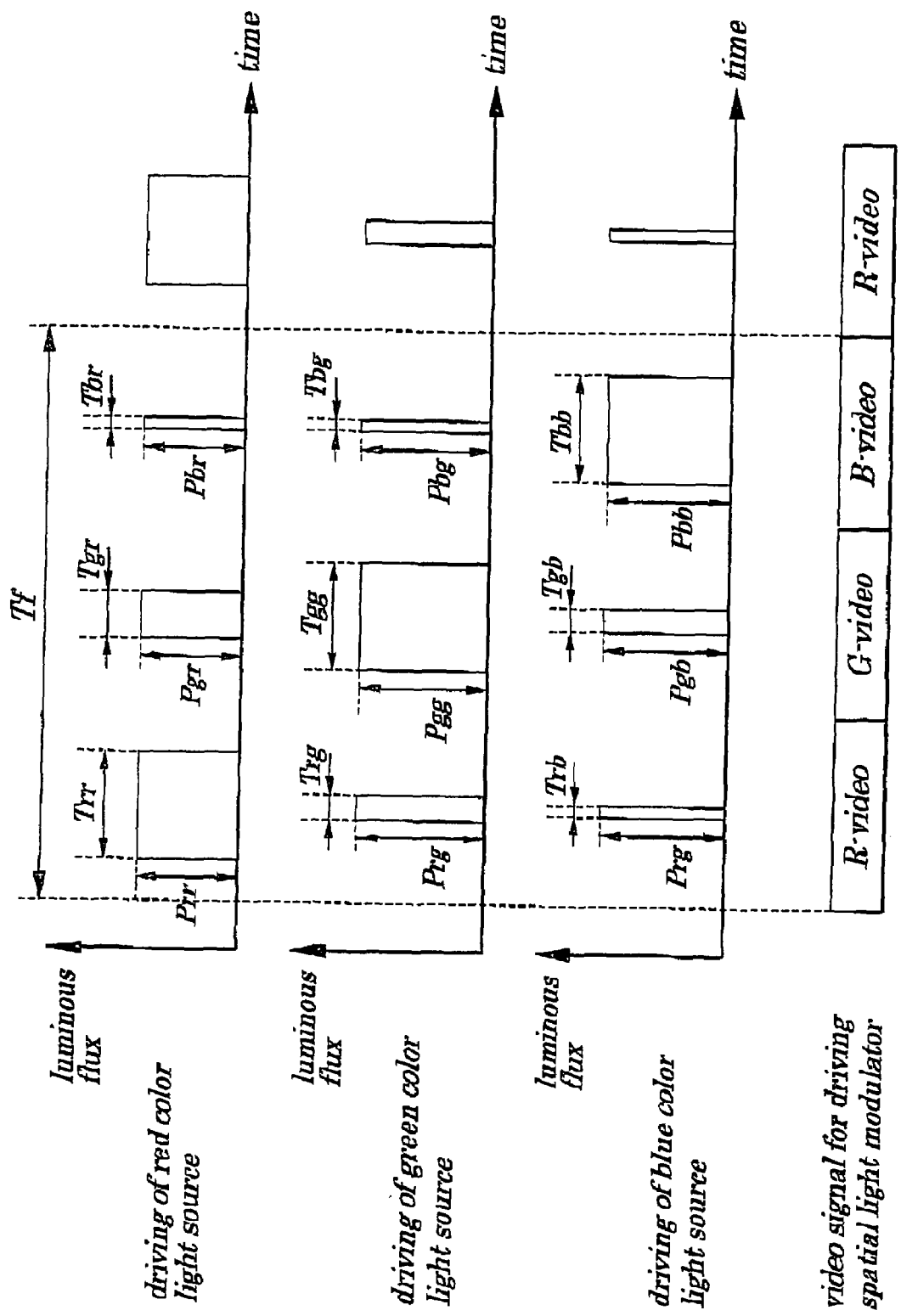
FIG. 6 is a timing chart showing another method for controlling a light source for each color employed in the video display device of the second embodiment of the present invention.
Figure 7:
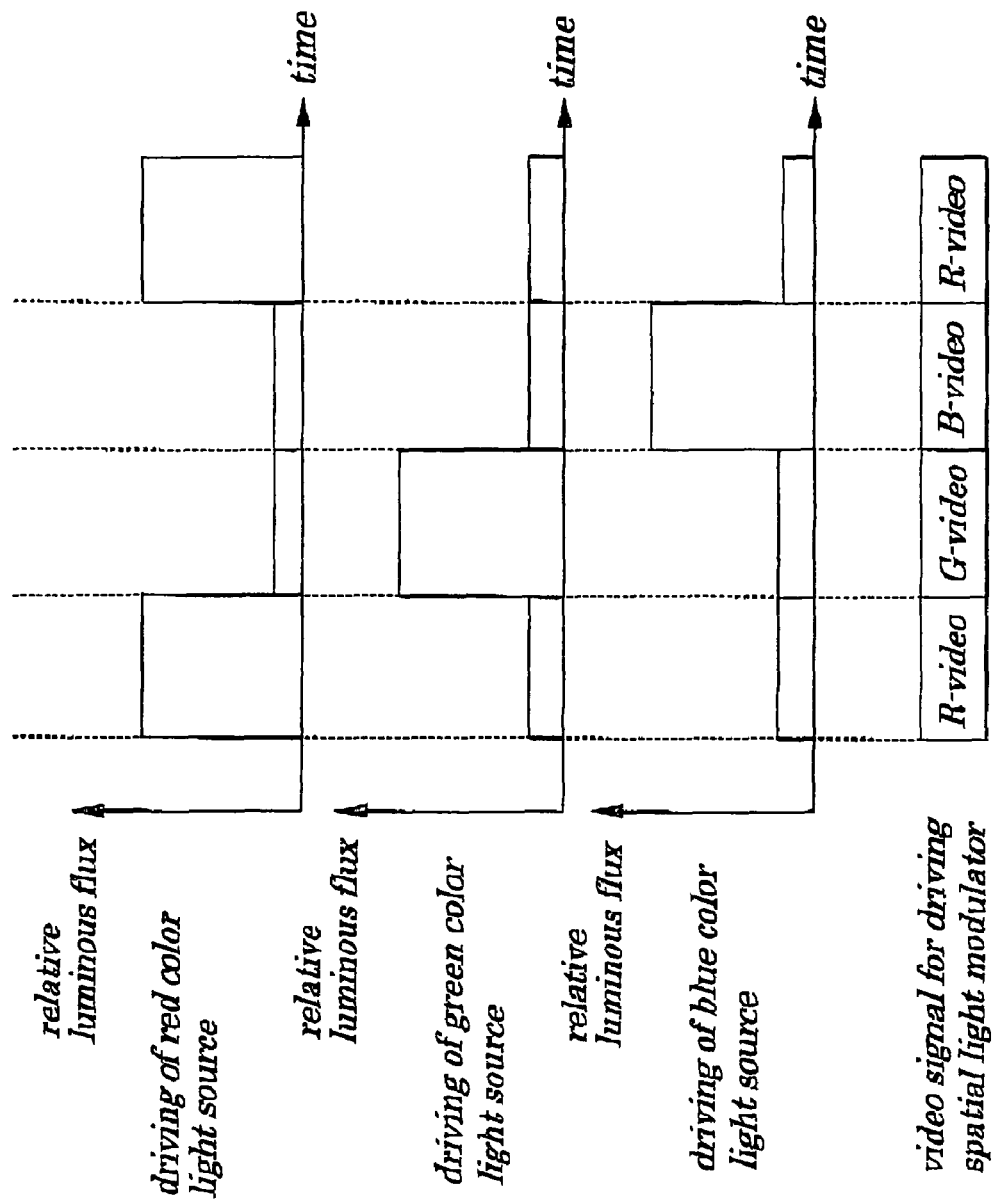
FIG. 7 is a timing chart showing still another method for controlling a light source for each color employed in the video display device of the second embodiment of the present invention.
Figure 8:
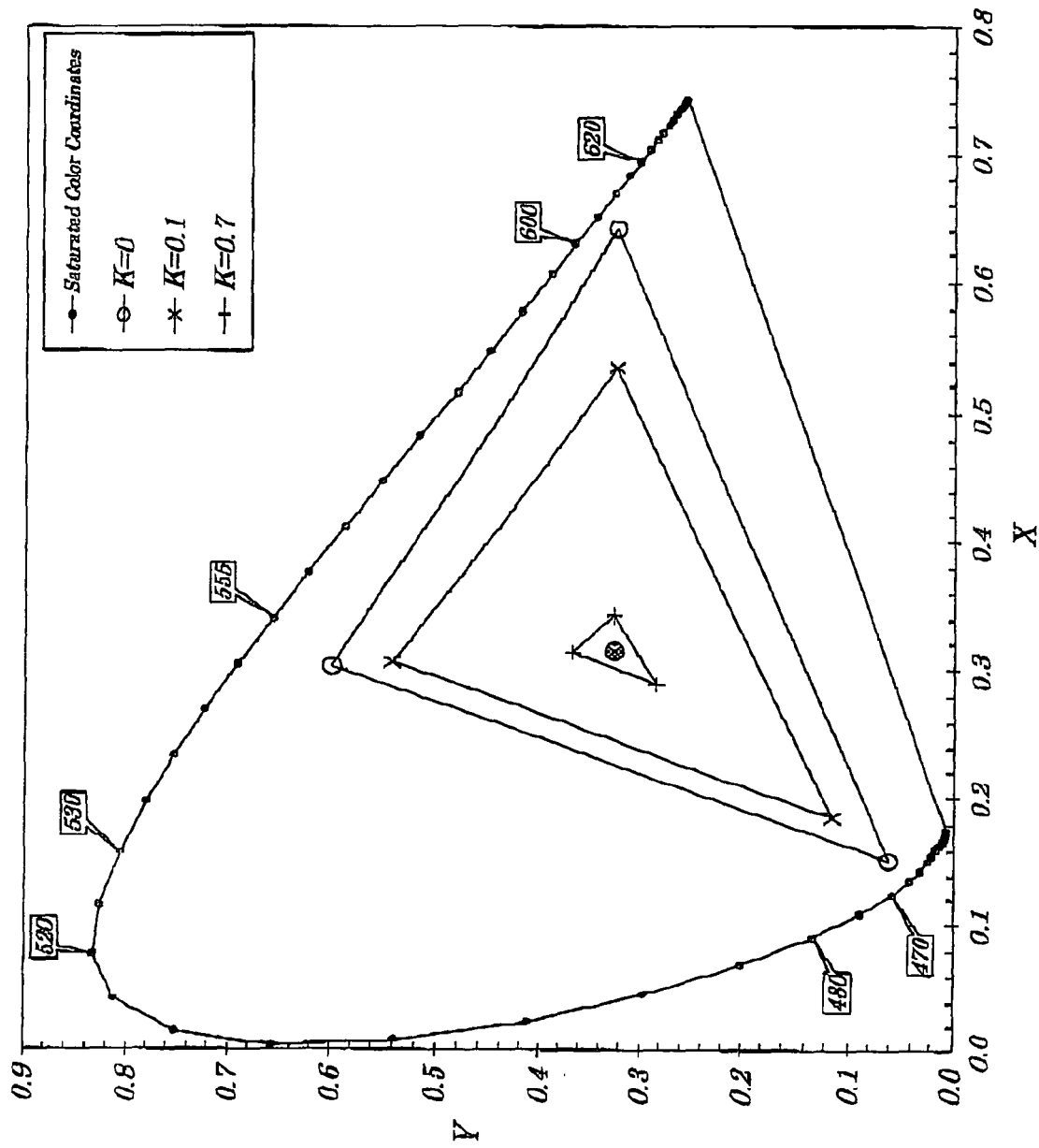
FIG. 8 is a diagram showing one example of a color triangle on a chromaticity diagram in the CIE (Commision Internationale de l'Eclairage) 1931 standard colorimetric system.

5 is a timing chart showing a method for controlling a light source for each color employed in the color-sequence-type video display device of the second embodiment. FIG. 6 is a timing chart showing another method for controlling the light source for each color employed in the color-sequence-type video display device of the second embodiment. FIG. 7 is a timing chart showing still another method for controlling the light source for each color employed in the color-sequence-type video display device of the second embodiment. FIG. 8 is a diagram showing one example of a color triangle on a chromaticity diagram in the CIE 1931 standard colorimetric system.

The color-sequence-type video display device of the second embodiment, as shown in FIG. 4, chiefly includes a light source section 10, a red color light source driving circuit 21, a green color light source driving circuit 22, a blue color light source driving circuit 23, a spatial light modulator 30, a spatial light modulator driving circuit 41, a red image memory 51, a green image memory 52, a blue image memory 53, a video signal processing circuit 54, a 3-1 selecting circuit (RGB sequentially selecting circuit) 56, and a timing control circuit 62. The light source section 10 has a red color light source 11, a green color light source 12, a blue color light source 13, and a color synthesis optical system 15.

First, configurations of optical systems in the color-sequence-type video display device of the second embodiment are described by referring to FIG. 4. However, FIG. 4 does not show physical and concrete positions and arrangements of each of optical components. In the light source section 10, the red color light source 11 emits red color light, the green color light source 12 emits green color light and the blue color light source 13 emits blue color light, The color synthesis optical system 15 outputs sequentially light synthesized from incident red color light, incident green color light, and incident blue color light to a same optical path. The spatial light modulator 30 sequentially performs spatial light modulation on light emitted from the color synthesis optical system 15 according to a spatial light modulator driving signal fed from the spatial light modulator driving circuit 41 and emits the modulated light as image light. The image light emitted from the spatial light modulator 30 is sequentially projected through a projection optical system (not shown) onto a screen (not shown).

An LED (Light Emitting Diode) can be suitably used for the red color light source 11, the green color light source 12, and the blue color light source 13. This is because the LED can produce single light of each of red, green, and blue colors; luminous flux in the LED can be controlled by a value of a current to be applied, and its response time is as short as several microseconds or less which is sufficiently shorter than a frame period of an image to be displayed. The light source can be controlled by a way as described later. Moreover, so long as a light source has such characteristics as described above, any light source besides the LED such as a laser diode or a like may be also employed. Also, if the LED is used as the light source for the color-sequence-type video display device, since quantity of light emitted from one piece of the LED is not sufficient, it is preferable that a plurality of LEDs is used for each color light.

The spatial light modulator 30 is used to change optical transmittance or optical reflectance in each portion in space having a specified size according to an image to be displayed and is made up of a TN liquid crystal panel, ferroelectric liquid crystal panel, DMD, or a like. The TN liquid crystal panel is constructed by using properties of rotary polarization, double refraction, or a like of an optical transmissive substance making up a pixel in which a degree of optical polarization in each portion changes depending on a voltage value of a video signal to be applied and, therefore, by using the TN liquid crystal panel as the spatial light modulator 30, control can be exerted so that intensity of light transmitting through the spatial light modulator 30 is spatially changed.

The ferroelectric liquid crystal panel uses a property of double refraction of a substance making up a pixel and is made to transition between two polarized states, that is, from its ON state to its OFF state depending on polarity of a voltage to be applied. Brightness of light transmitting through the ferroelectric liquid crystal panel is controlled by a PWM (Pulse Width Modulation) method for an applied voltage. That is, the longer a time for the ON state and the shorter a time for the OFF state, the more the light transmitting through the panel increases and, therefore, brightness of light transmitting through the ferroelectric liquid crystal panel can be controlled by adjusting time allotment for the ON and OFF states.

Two types of each of the TN liquid crystal panel and the ferroelectric liquid crystal panel are available, one being of a transmissive type and another being of a reflection type. In the case of the spatial light modulator employing a transmissive-type liquid crystal panel, a polarizer is placed both on a light-incident side and on a light-outgoing side in the liquid crystal panel. In the case of the spatial light modulator employing a reflection-type liquid crystal panel, a PBS (Polarizing Beam Splitter) is mounted on a light-incident and light-outgoing side in the liquid crystal panel.

The DMD is a reflection-type spatial light modulator having micro-mirrors in numbers corresponding to a number of pixels and uses a property in which a tilt of the each of the micro-mirrors is changed depending on a polarity of a voltage to be applied. The tilt of micro-mirrors to be controlled is in two states (ON state and OFF state) and brightness of light passing through the micro-mirrors is controlled by the PWM method for an applied voltage. That is, the longer a time for the ON state and the shorter a time for the OFF state, the brighter the light passing through the micro-mirrors and, therefore, brightness is adjusted by controlling time allotment to the ON state and OFF state. In some cases, in order to prevent contrast of light from being lowered due to leakage of light being in the OFF state contained in reflected light into a projection optical system, a total reflection prism is used.

Next, configurations of circuits in the color-sequence-type video display device of the second embodiment are described again by referring to FIG. 4.

Each of the red color light driving circuit 21, the green color light source driving circuit 22, the blue color light source driving circuit 23, according to a timing signal fed from the timing control circuit 62, drives each of the red color light source 11, the green color light source 12, and the blue color light source 13 to control brightness of light fed from each of the light sources 11, 12, and 13.

Brightness of light from the red color light source 11, the green color light source 12, and the blue color light source 13 may be controlled by an amount of power to be applied from the red color light source driving circuit 21, the green color light source driving circuit 22, and the blue color light source driving circuit 23, respectively, to the red color light source 11, the green color light source 12, and the blue color light source 13 or by the time during which driving power is being supplied. Moreover, when each of the light sources 11, 12, and 13 is made up of a plurality of light emitting devices, brightness of light fed from the light sources 11, 12, and 13 may be calibrated by changing a number of the light emitting devices used to have each of the light sources 11, 12, and 13 be emitted. Also, brightness of light fed from the light sources 11, 12, and 13 may be calibrated by using the light sources 11, 12, and 13 in combination with a filter that can control optical transmittance such as a liquid crystal panel or a like, iris mechanism, or a like. Furthermore, the red color light source driving circuit 21, the green color light source driving circuit 22, and the blue color light source driving circuit 23 may adjust the brightness of light fed from each of the light sources 11, 12, and 13 using an external control unit.

The spatial light modulator driving circuit 41, according to a video signal for each of red, green, and blue colors fed from the 3-1 selecting circuit (RGB sequentially selecting circuit) 56, sequentially controls optical transmittance or reflectance in image space of the spatial light modulator 30. Each of the red image memory 51, the green image memory 52, and the blue image memory 53 stores a video signal for each of red color, green color, and blue color written by the video signal processing circuit 54 and outputs the video signal read by the video signal processing circuit 54 to the 3-1 selecting circuit 56.

The video signal processing circuit 54, according to an input video signal S1, performs video signal processing such as sync detection, color space conversion, degamma processing, correction of characteristics specific to a system or a like and produces a video signal for a red color, a video signal for a green color, and a video signal for a blue color. Moreover, here the correction of characteristics specific to a system represents, for example, corrections of dispersion of optical components and/or corrections to be made when a relation between a control voltage and optical transmittance is nonlinear which becomes necessary, in particular, when a transmissive liquid crystal is used as the spatial light modulator 30. Also, the video signal processing circuit 54 accumulates a video signal for each of red color, green color, and blue color on each of the red image memory 51, the green image memory 52, and the blue image memory 53 and exerts control to read the video signals for each of red, green, and blue colors from each of the red image memory 51, the green image memory 52, and the blue image memory 53.

The 3-1 selecting circuit (RGB sequentially selecting circuit) 56, according to timing control by the timing control circuit 62, receives a video signal for each of the red color, the green color, and blue color read from the red image memory 51, the green image memory 52, the blue image memory 53 and sequentially selects one of the red color light, the green color light, and the blue color light and outputs the selected color light to the spatial light modulator driving circuit 41. The timing control circuit 62, according to the input video signal S1, controls operation timing for the red color light source driving circuit 21, the green color light source driving circuit 22, the blue color light source driving circuit 23, the spatial light modulator driving circuit 41, the video signal processing circuit 54, and the 3-1 selecting circuit 56.

Control and operations of the color-sequence-type video display device of the embodiment are described by referring to FIG. 4 to FIG. 8. First, a first method for controlling the light sources of each color in the color-sequence-type video display device of the second embodiment is explained by referring to FIG. 5. In the video display device in the embodiment shown in FIG. 4, during one frame period, the spatial light modulator 30 is driven by a video signal for a red color (R-video), a video signal for a green color (G-video), and a video signal for a blue color (B-video) in order and brightness of each of the red color light source 11, the green color light source 12, and the blue color light source 13 is controlled according to timing of each of the light sources 11, 12, and 13.

Figure 5:
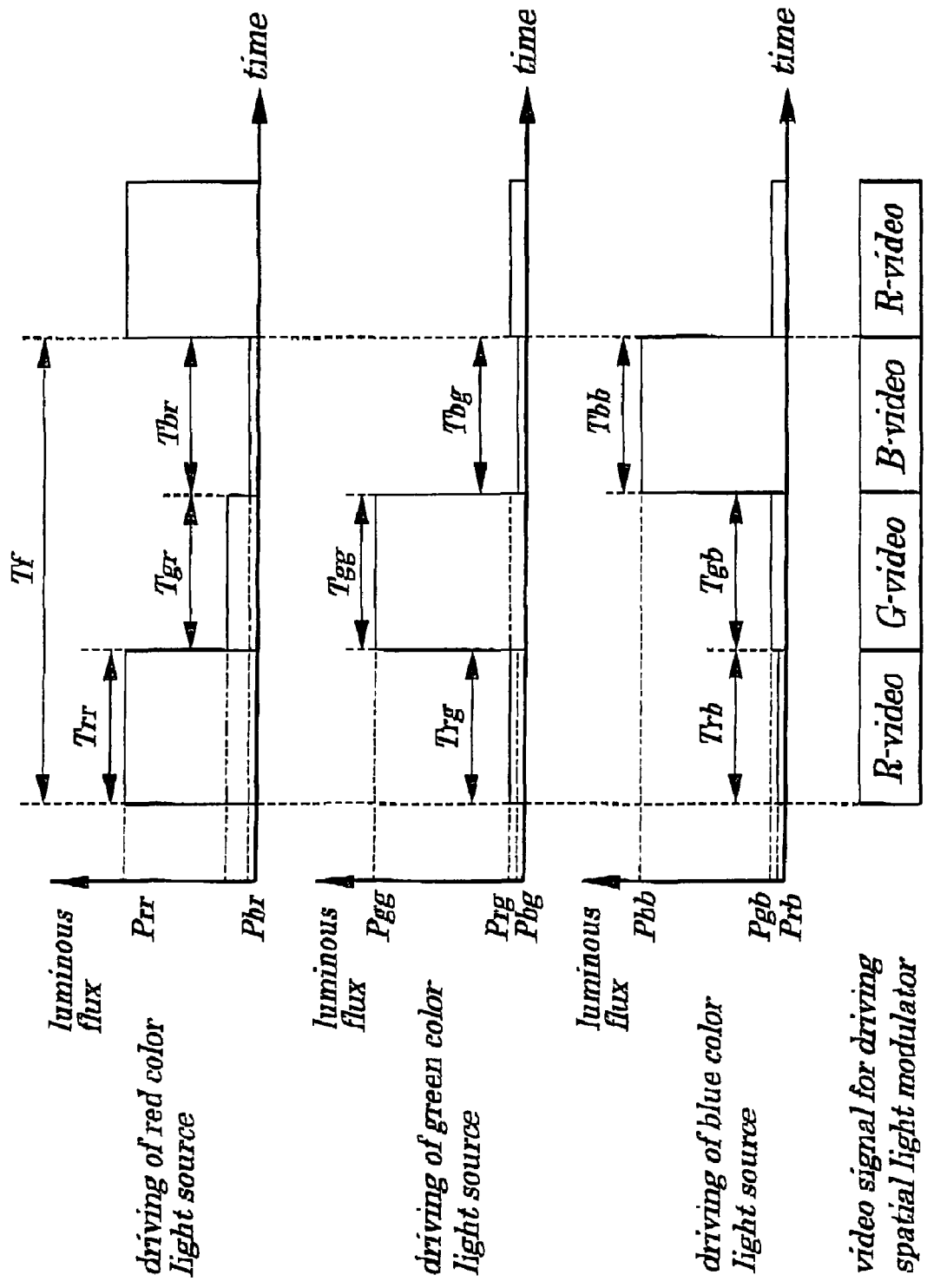
FIG. 5 is a timing chart showing a method for controlling a light source for each color employed in the video display device of the second embodiment of the present invention.

Now, as shown in FIG. 5, let it be assumed that time required to modulate red color light fed from the red color light source 11 using a video signal for each of the red color, the green color, and the blue color in the spatial light modulator 30 is "Trr", "Tgr", and "Tbr" respectively and luminous flux of red color light to be modulated is "Prr", "Pgr", and "Pbr", respectively. Similarly, let it be assumed that time required to modulate green color light fed from the green color light source 11 using a video signal for each of the red color, the green color, and the blue color in the spatial light modulator 30 is "Trg", "Tgg", and "Tbg", respectively and luminous flux of green color light to be modulated is "Prg", "Pgg", and "Pbg", respectively. Moreover, time required to modulate blue color light fed from the green color light source 11 using a video signal for each of the red color, the green color, and the blue color in the spatial light modulator 30 is "Trb", "Tgb", and "Tbb" respectively and luminous flux of blue color light to be modulated is "Prb", "Pgb", and "Pbb", respectively.

By substituting these variables into the equations (1) and (2), as in the case of the first embodiment, equations (3) and (4) hold and color light having the same chromaticity coordinates as three primary colors (R, G, B) or a standard white (W) in specifications of colorimetry by which a video signal is defined can be produced or color reproductivity as desired can be achieved. According to the example of the controlling method shown in FIG. 5, light source of any one of colors is being lit all the time and setting is made so that, approximately, Trr=Tgr=Tbr=Trg=Tgg=Tbg=Trb=Tgb=Tbb. Moreover, a period during which the light source is turned OFF may be introduced depending on a controlling state by the spatial light modulator 30.

FIG. 6 is a timing chart showing the second method for controlling the light source for each color employed in the color-sequence-type video display device of the second embodiment of the present invention. In the example shown in FIG. 5, as in the case of the first embodiment, setting is done so that, approximately, Trr=Tgr=Tbr=Trg=Tgg=Tbg=Trb=Tgb=Tbb, however, as is apparent from the equation (1), since all that is needed is that each of Prr×Trr, Prg×Trg, Prb×Trb, Pgr×Tgr, Pgg×Tgg, Pgb×Tgb, Pbr×Tbr, Pbg×Tbg, and Pbb×Tbb is constant, setting may be also done so that, as shown in FIG. 6, for example, Prr=Pgr=Pbr, Prg=Pgg=Pbg, and Prb=Pgb=Pbb, which makes constant power to be applied to each of the light sources. By operating as above, since power to be applied to each of the light sources becomes constant, influences caused by an individual difference in a luminous flux—applied power characteristic, a change in temperatures, a change with a passage of time, or a like in the light sources can be reduced, which enables a number of adjusting processes to be also reduced and a change in a tint caused by temperatures, a secular change, or a like to be prevented.

Thus, in the color-sequence-type video display device of the second embodiment, since a time mean value of luminous flux is controlled and since a color image synthesized from each color image light obtained by spatial light modulation performed according to a video signal in each of spatial light modulators for red, green, and blue colors is obtained, it is made possible to achieve color reproductivity as desired, irrespective of chromaticity coordinates of a color light from each of the light sources, by setting chromaticity coordinates of light of each of the three primary colors and of a white color. Therefore, even when a light source is used in which chromaticity coordinates of light of each of its three primary colors are different from those designated by specifications of colorimetry by which a video signal is defined, substantial reproductivity of three primary colors can be improved.

Next, a third method for controlling the light source of each color in the color-sequence-type display device of the second embodiment is described by referring to the timing chart shown in FIG. 7. In the video display device of the second embodiment, the order of video signals for driving the red color spatial light modulator 30 is a video signal for a red color, for a green color, and for a blue color. However, the present invention is not limited to the order described above.

According to the color-sequence-type video display device, while a video signal for a red color (R-video) is selected, not only the red color light source 11 but also the green color light source 12 and the blue color light source 13 are driven to emit light of each color. While a video signal for a green color (G-video) is selected, not only the green color light source 12 but also the blue color light source 13 and the red color light source 11 are driven to emit light of each color. While a video signal for a blue color (B-video) is selected, not only the blue color light source 13 but also the red color light source 11 and the green color light source 12 are driven to emit light of each color.

Now, let it be assumed that, when an attention is focused on a pixel, a video signal for a red color, a video signal for a green color, and a video signal for a blue color each controlling a degree of optical modulation of light of each color corresponding to the focused pixel in the spatial light modulator 30 are "Vr", "Vg", and "Vb" respectively and that following expressions hold:

$$0 \leq Vr \leq 1 \qquad \text{Expression (9a)}$$

$$0 \leq Vg \leq 1 \qquad \text{Expression (9b)}$$

$$0 \leq Vb \leq 1 \qquad \text{Expression (9c)}$$

First, a case is described where brightness of a video is not enhanced. Here, an average value of luminous flux of red color light, green color light, and blue color light being applied to a focused pixel during one frame period in the spatial light modulator 30 are expressed as "Pr", "Pg" and "Pb", respectively. Moreover, a variable "Prgb" is defined as below:

$$Prgb = Pr + Pg + Pb \qquad \text{Equation (10)}$$

where "Prgb" is luminous flux of light synthesized from red color light, green color light, and blue color light, that is, luminous flux of white color light.

When red color luminous flux, green color luminous flux, blue color luminous flux, synthesized luminous flux being emitted for a focused pixel from the spatial light modulator 30 during one frame period are expressed as "Lr", "Lg", "Lb" and "Lrgb", following equations hold:

$$Lr = Pr \times Vr \qquad \text{Expression (11a)}$$

$$Lg = Pg \times Vg \qquad \text{Expression (11b)}$$

$$Lb = Pb \times Vb \qquad \text{Expression (11c)}$$

$$Lrgb = Lr + Lg + Lb \qquad \text{Expression (11d)}$$

Next, a case is described when brightness of a video is enhanced. When brightness of a video is enhanced, not only red color light is modulated by a video signal for a red color but also green color light and blue color light are modulated, not only green color light is modulated by a video signal for a green color but also blue color light and red color light are modulated, and not only blue color light is modulated by a video signal for a blue color but also red color light and green color light are modulated. This causes brightness of an image being emitted from the spatial light modulator 30 to be enhanced.

That is, luminous flux being modulated by a video signal for a red color during one frame period and being emitted from the spatial light modulator 30 for a focused pixel is given by a following expression:

$$(Pr + K \times (Pg + Pb)) \times Vr \qquad \text{Expression (12a)}$$

Similarly, luminous flux being modulated by a video signal for a green color and being emitted from the spatial light modulator 30 is given by a following expression:

$$(Pg + K \times (Pb + Pr)) \times Vg \qquad \text{Expression (12b)}$$

Likewise, luminous flux being modulated by a video signal for a blue color and being emitted from the spatial light modulator 30 is given by a following expression:

$$(Pb + K \times (Pr + Pg)) \times Vb \qquad \text{Expression (12c)}$$

wherein "k" is a coefficient indicating a degree to which brightness is enhanced and expressed by a following expression:

$$0 \leq K \leq 1 \qquad \text{Expression (13)}$$

Now, if luminous flux of synthesized light is Lrgb', Lrgb' is given by a following equation:

$$Lrgb' = Lrgb + K \times (Pr \times (Vg + Vb) + Pg \times (Vb + Vr) + Pb \times (Vr + Vg)) \qquad \text{Expression (14)}$$

That is, $$Lrgb' = Lrgb \times (1-K) + Prgb(Vr + Vg + Vb) \times K \qquad \text{Expression (15)}$$

Therefore, a following expression holds:

$$Lrgb \leq Lrgb' \leq Lrgb \qquad \text{Expression (16)}$$

As a result, though brightness is enhanced, a hue remains unchanged. When an extreme case occurs, that is, K=0, since Lrgb'=Lrgb, brightness is not enhanced. Moreover, when K=1, since Lrgb'=Prgb×(Vr+Vg+Vb), maximum enhancement of brightness is obtained, however, light becomes achromatic.

FIG. 8 shows one example of a color triangle that can be obtained when "K" is used as a parameter in the chromaticity diagram in the CIE 1931 standard colorimetric system (XYZ colorimetric system). Moreover, numerals represented by a mark "·" shown in a spectrum locus in FIG. 8 show a wavelength of light (unit being "nm"). As is apparent from FIG. 8, as "K" becomes larger, the color triangle moves to an inner side. Chromaticity coordinates of a white point shown by a mark "✻" do not move and each vertex of color triangles exists on straight lines connecting a vertex of the color triangle obtained when "K"=0 to the white point. As a value of "K" becomes larger, though a hue does not change, color saturation gradually becomes lower.

Thus, as is apparent from what was described above, in the color-sequence-type video display device of the embodiment, both brightness and color saturation are in a relation (trade-off) in which both cannot be satisfied at a same time. A degree of enhancement of brightness constitutes a matter of concerns of specifications of a product. It is generally desired that an image is brighter in a brighter viewing environment. In an application to presentation, in many cases, since color saturation of an image is not of much importance, it is preferable that brightness is enhanced even it saturation is lowered. On the other hand, when a video software is viewed, since color saturation is an important factor, in many cases, viewing environment is made darker and, therefore, it is preferred that priorities are assigned to color saturation without enhancing brightness.

Thus, in the color-sequence-type video display device of the embodiment, a degree of enhancement of brightness may be calibrated depending on contents of a video source or a viewing environment. The degree of enhancement of brightness may be adjusted in the red color light source driving circuit 21, the green color light source driving circuit 22, and the blue color light source driving circuit 23. Moreover, the degree of enhancement of brightness in the light source driving circuit for each color may be controlled externally.

As described above, according to the color-sequence-type video display device of the embodiment, when a spatial light modulator is controlled according to a video signal for a red color, a green color light and a blue color light in addition to red color light are applied, when the spatial light modulator is controlled according to a video signal for a green color, a blue color light and a red color light in addition to the green color light are applied, and when the spatial light modulator is controlled according to a video signal for a blue color, a red color light and a green color light in addition to the blue color light are applied. As a result, enhancement of brightness of a video can be made possible.

Third Embodiment

Figure 9:
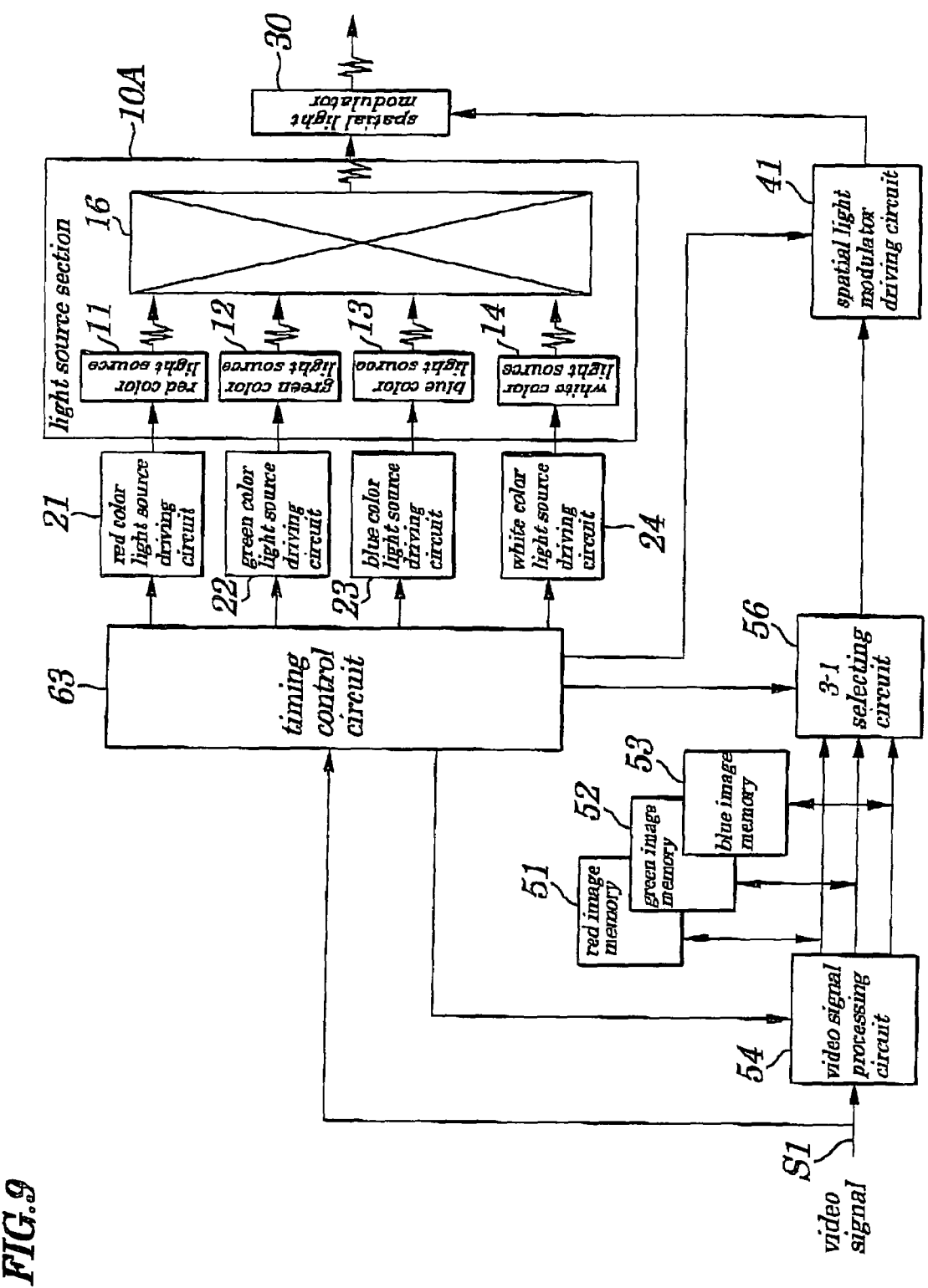
FIG. 9 is a schematic block diagram showing configurations of a video display device according to a third embodiment of the present invention.
Figure 10:
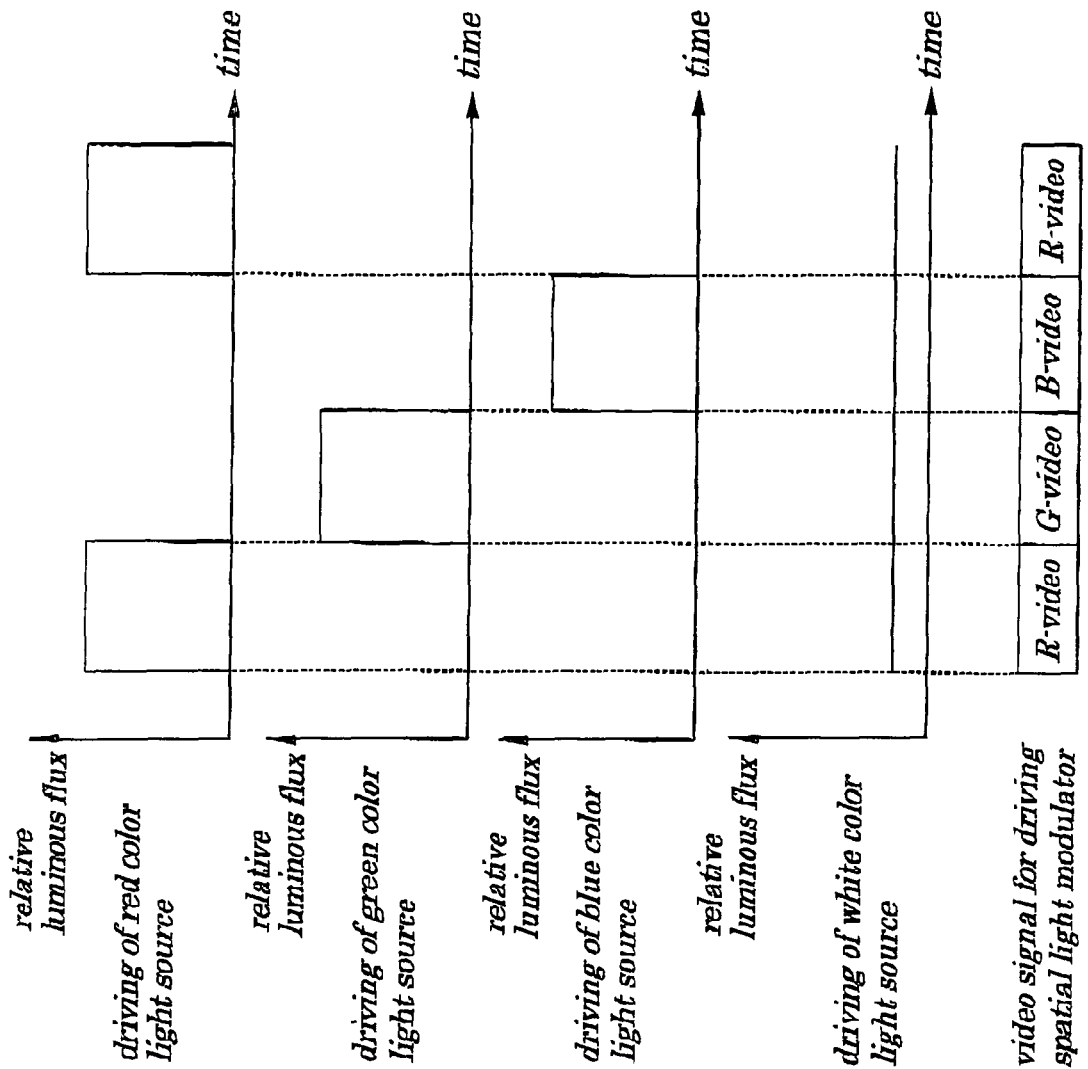
FIG. 10 is a timing chart showing a method for controlling a light source for each color in the video display device according to the third embodiment of the present invention.
Figure 11:
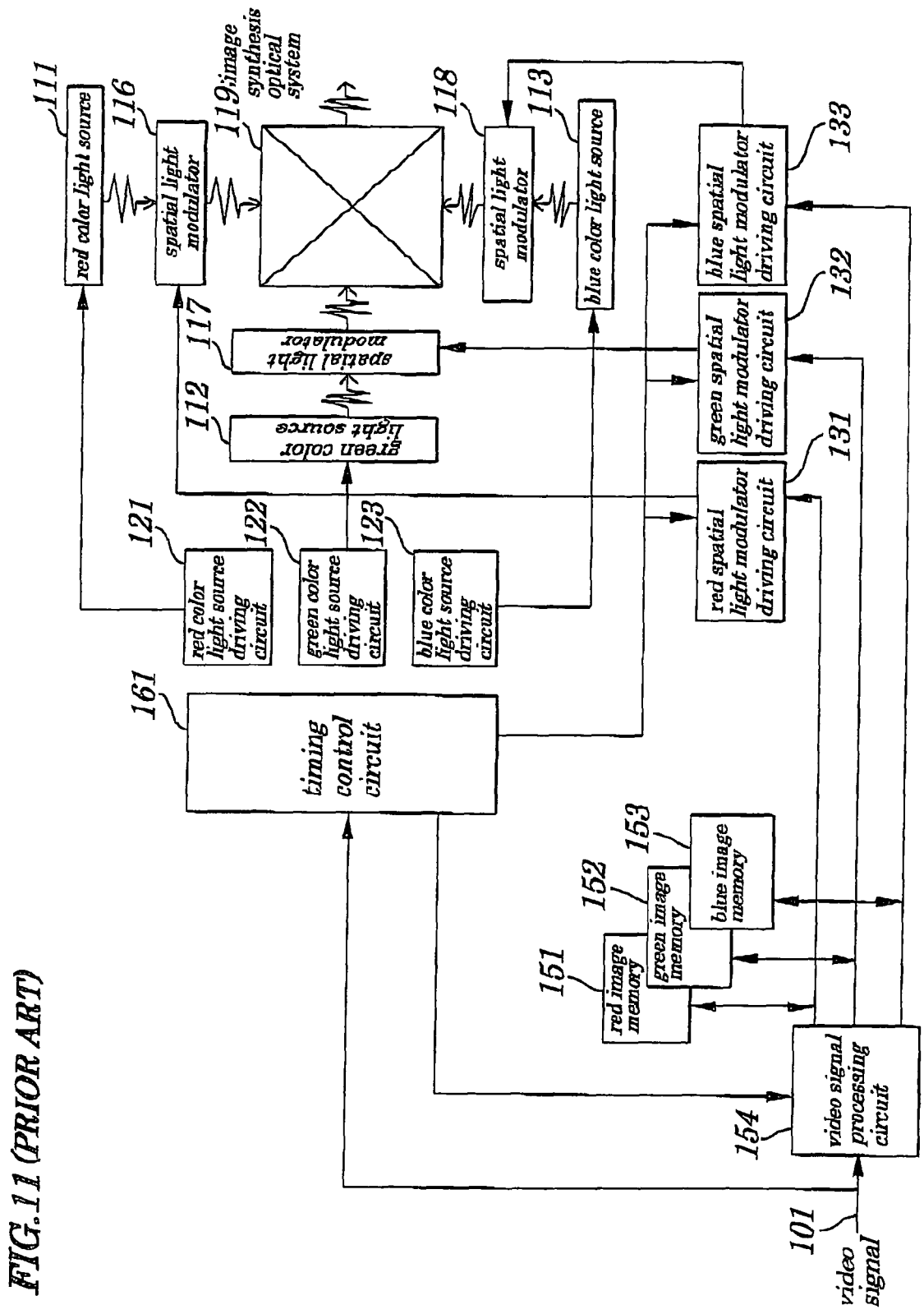
FIG. 11 is a schematic block diagram showing an example of configurations of a conventional spatial modulating—type video display device.
Figure 12:
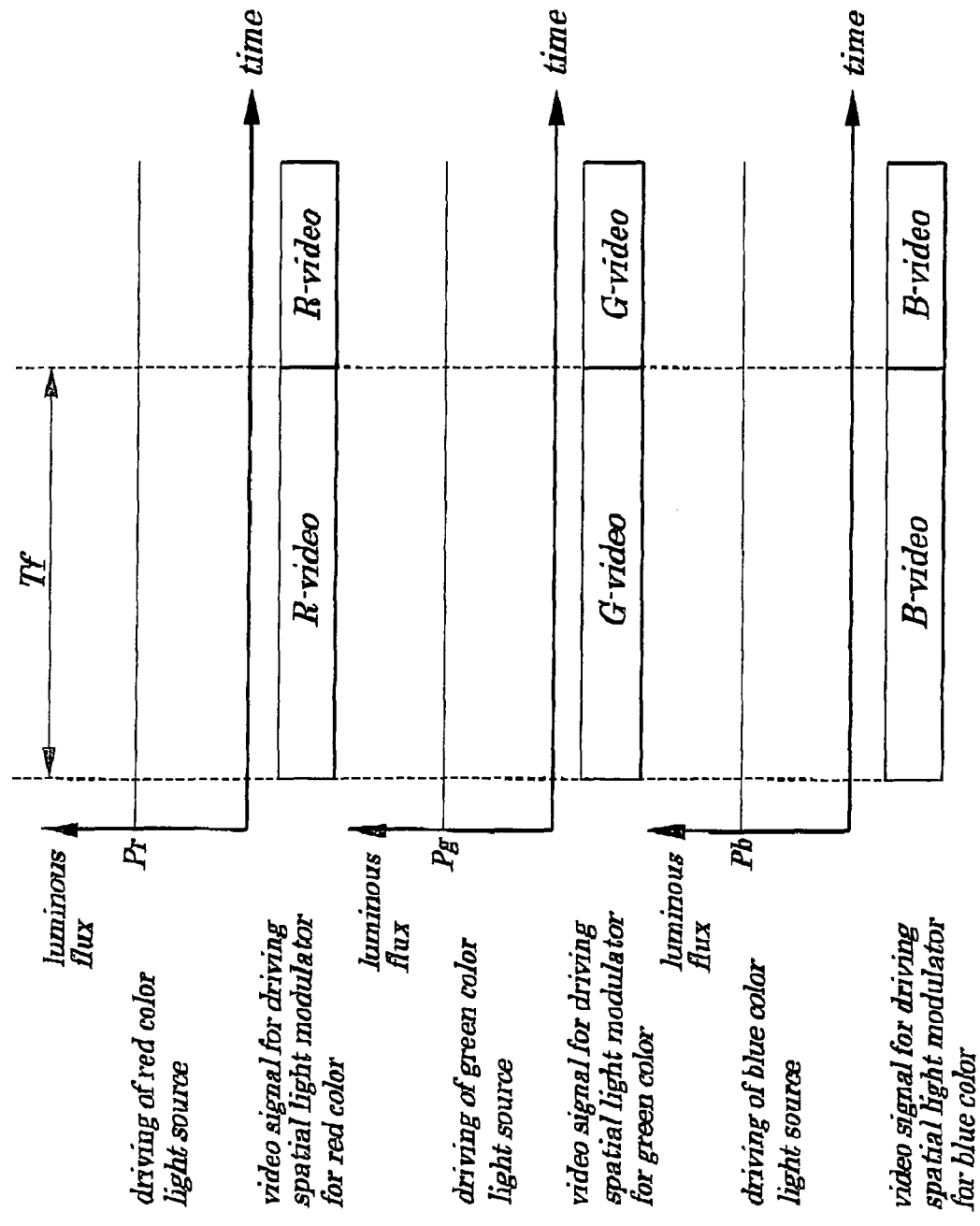
FIG. 12 is a timing chart showing a method for controlling a light source for each color employed in the conventional video display device.
Figure 13:
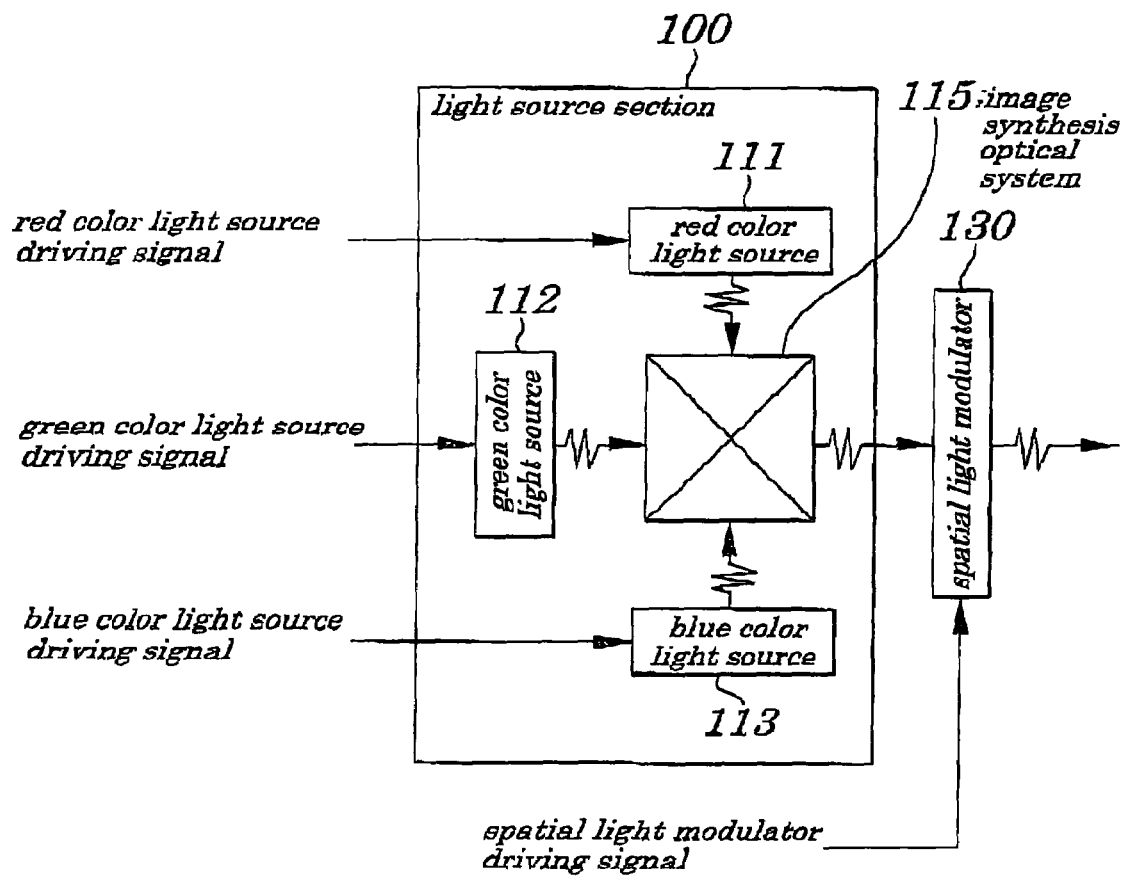
FIG. 13 is a schematic block diagram showing configurations of an optical system in a conventional video display device.
Figure 14:
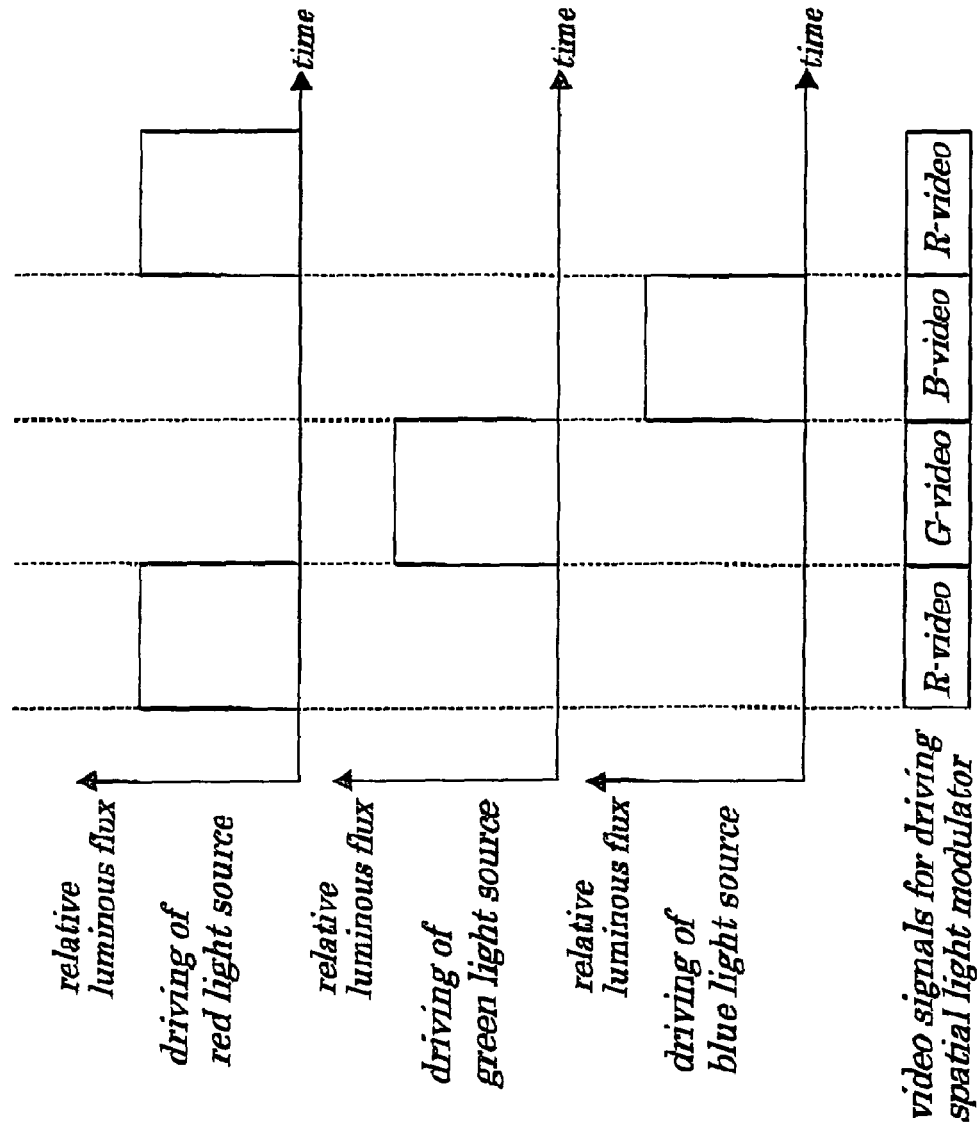
FIG. 14 is a timing chart showing a control method of a light source of each color in the conventional video display device.

FIG. 9 is a schematic block diagram showing configurations of a color-sequence-type video display device according to a third embodiment of the present invention. FIG. 10 is a timing chart showing a method for controlling a light source for each color in the color-sequence-type video display device according to the third embodiment. The color-sequence-type video display device of the third embodiment, as shown in FIG. 9, chiefly includes a light source section 10A, a red color light source driving circuit 21, a green color light source driving circuit 22, a blue color light source driving circuit 23, a white color light source driving circuit 24, a spatial light modulator 30, a spatial light modulator driving circuit 41, a red image memory 51, a green image memory 52, a blue image memory 53, a video signal processing circuit 54, a 3-1 selecting circuit (RGB simultaneously selecting circuit) 56, and a timing control circuit 63. Moreover, the light source section 10A is made up of a red color light source 11, a green color light source 12, a blue color light source 13, and a white color light source 14, and a color synthesis optical system 16.

First, configurations of optical systems in the color-sequence-type video display device of the third embodiment are described. However, FIG. 9 does not show physical and concrete positions and arrangements of each of optical components. In the light source section 10A, the red color light source 11 emits red color light, the green color light source 12 emits green color light, the blue color light source 13 emits blue color light, and the white color light source 14 emits white color light. The color synthesis optical system 16 sequentially emits color light synthesized from incident red color light, green color light, and blue color light to a same optical path. The spatial light modulator 30 performs spatial light modulation on light emitted from the color synthesis optical system 16 according to a spatial light modulator driving signal fed from the spatial light modulator driving circuit 41 and emits it as image light. Image light of each color emitted from the spatial light modulator 30 is sequentially projected through a projection optical system (not shown) onto a screen (not shown).

In the third embodiment, as the red color light source 11, the green color light source 12, and the blue color light source 13, same components as employed in the second embodiment are used. As the white color light source 14, like in the case of the red color light source 11, the green color light source 12, and the blue color light source 13, an LED is preferably used. This is because luminous flux can be easily controlled and optical system can be easily constructed. Moreover, a discharge lamp or a like besides the LED can be used as the white color light source.

The color synthesis optical system 16 may be constructed by using, for example, a cross dichroic prism, polarizing beam combiner, and two polarization unifying units. Color synthesis is performed on light fed from the red color light source 11, the green color light source 12, and the blue color light source 13 by using the polarization unifying unit and the synthesized color is unified so that light of all of the colors become p-polarized light. Light fed from the white light source 14 is unified by using another polarization unifying unit so that light of all of the colors become s-polarized light. Color synthesis is performed, by using a beam combiner, on synthesized color light of red color light, green color light, and blue color light all having been unified so as to be p-polarized light, and white color light having been unified so as to be s-polarized light. If the spatial light modulator 30 is a liquid crystal panel that requires straight-line polarized light as incident light, still another polarization unifying unit on a side of light emission of the polarized beam combiner is placed. If the spatial light modulator 30 is a DMD requiring no polarized light as incident light, a ¼ wavelength plate may be placed on a side of light emission of a polarized beam combiner. Thus, the color synthesis optical system 16 that synthesizes light fed from the red color light source 12, the green color light source 13, and the white color light source 14 may be constructed.

In the third embodiment, as the spatial light modulator 30, same components as employed in the second embodiment shown in FIG. 4 can be used.

Next, configurations of circuits of the color-sequence-type video display device of the third embodiment are described by referring again to FIG. 9. Circuit configurations of the third embodiment are almost the same as those shown in the second embodiment and differ from those in the second embodiment in that the white color light source 14 and white color light source driving circuit 24 are additionally incorporated. The white color light source driving circuit 24, according to a timing signal fed from the timing control circuit 63, controls brightness of the white color light source 14. Moreover, the white color light source 14 may be configured so as to be lit at specified luminous intensity all the time without inputting a timing signal fed from the timing control circuit 63 to the white color light driving circuit 24. Moreover, the white color light driving circuit 24 may be configured so that brightness of the white color light source 14 can be calibrated by external control (not shown).

Then, a method for controlling the light source of each color in the color-sequence-type display device of the third embodiment is described by referring to the timing chart shown in FIG. 10. Though, in the color-sequence-type video display device of the third embodiment, the order of video signals for driving the spatial light modulator 30 is a video signal for a red color, for a green color, and for a blue color, however, the present invention is not limited to this order of the video signals.

In the color-sequence-type video display device of the third embodiment, while a video signal for a red color is selected, the red color light source 11 is driven to emit red color light. While a video signal for a green color is selected, the green color light source 12 is driven to emit green color light. While a video signal for a blue color is selected, the blue color light source 13 is driven to emit white color light.

Now, let it be assumed that, when an attention is focused on a pixel, a video signal for a red color, a video signal for a green color, and a video signal for a blue color each controlling a degree of optical modulation of light of each color corresponding to the focused pixel in the spatial light modulator 30 are "Vr", "Vg", and "Vb" respectively. In this case, relations shown in the above expressions 9a, 9b, and 9c hold.

First, a case is explained where brightness of a video is not enhanced. Here, an average value of luminous flux of red color light, green color light, and blue color light being applied to a focused pixel during one frame period in the spatial light modulator 30 are expressed as "Pr", "Pg" and "Pb", respectively. Moreover, a variable "Prgb" is defined as the expression (10) described above.

Now, let it be assumed that, when an attention is focused on a pixel, a video signal for a red color, a video signal for a green color, and a video signal for a blue color emitted from the spatial light modulator 30 during one frame period are "Lr", "Lg", and "Lb" respectively. In this case, relations shown in the above expressions (11a) to (11d) hold.

Next, a case is described in which brightness of a video is enhanced. When brightness of an image is enhanced, not only red color light but also white color light is modulated by a video signal for a red color, not only green color light but also white color light is modulated by a video signal for a green color, and not only blue color light but also white color light is modulated by a video signal for a blue color. This causes brightness of an image to be emitted from the spatial light modulator 30.

Now, let it be assumed that an average value of luminous flux of white color light, during one frame period, to be applied to a focused pixel in the spatial light modulator is "Pw". Here, adjustment using a color filter or a like is made so that chromaticity coordinates of white color light fed from the white color light source 14 match with chromaticity coordinates of synthesized light from red color light, green color light and blue color light. By operating as above, a constant "C" exists which satisfies a following equation:

$$Pw = C \times (Pr + Pg + Pb) \quad \text{Equation (17)}$$

Then, from the equation (10), a following equation holds:

$$Pw = C \times Prgb \quad \text{Equation (18)}$$

Moreover, luminous flux being modulated according to a video signal for a red color during one frame period for a focused pixel and being emitted from the spatial light modulator 30 is given by a following expression:

$$(Pr + K \times Pw) \times Vr \quad \text{Expression (19a)}$$

Likewise, luminous flux of light being modulated according to a video signal for a green color and being emitted from the spatial light modulator 30 is given by a following expression:

$$(Pg + K \times Pw) \times Vg \quad \text{Expression (19b)}$$

Also, luminous flux of light being modulated according to a video signal for a blue color and being emitted from the spatial light modulator 30 is given by a following expression:

$$(Pb + K \times Pw) \times Vb \quad \text{Expression (19c)}$$

where "K" is a coefficient indicating a degree of enhancement of brightness and is given by a following expression:

$$0 \leq K \leq 1 \quad \text{Expression (20)}$$

When luminous flux of synthesized light is "Lrgbw", a following expression is derived from the above expressions:

$$Lrgbw = Lrgb + K \times Pw \times (Vr + Vg + Vb) \quad \text{Expression (21)}$$

That is, $$Lrgbw = Lrgb + K \times C \times Prgb \times (Vr + Vg + Vb) \quad \text{Expression (22)}$$

From this, a following expression is derived:

$$Lrgb \leq Lrgbw \leq Lrgb \times (1 + 3C) \quad \text{Expression (23)}$$

That is, as a value of "K" becomes larger, brightness is enhanced the more and, though a hue remains unchanged, color saturation gradually is lowered. To solve this problem, as in the case of the second embodiment, a method may be employed in which a degree of enhancement of brightness can be calibrated by controlling the white light source driving circuit 24. Moreover, it is clear that brightness can be enhanced by combining methods employed in the second and third embodiments.

Thus, according to the color-sequence-type video display device of the embodiment, when the spatial light modulator is controlled according to a video signal for a red color, white color light besides the red color light is applied, when the spatial light modulator is controlled according to a video signal for a green color, white color light besides the green color light is applied, and when the spatial light modulator is controlled according to a video signal for a blue color, white color light besides the blue color light is applied and, therefore, brightness of a video can be enhanced.

It is apparent that the present invention is not limited to the above embodiments but may be changed and modified without departing from the scope and spirit of the invention. For example, in order to reduce shading of light emitted from each of the light sources, an optical integrator may be introduced on a side of outputting of each of the light sources. In the first embodiment, orders of video signals input to each of the spatial light modulators may be the video signal for a red color, a green color, and a blue color. Also, in the second embodiment, orders of video signals input to each of the spatial light modulator during one frame period are not limited to the video signal for a red color, a green color, and a blue color and other orders may be employed.

Moreover, in each of the above embodiments, during one frame period, a period during which light of each of the red, green, and the blue colors is emitted is switched only one time for each color, however, the periods during which light is emitted may be switched a plurality of times (for example, for the red color, the green color, the blue color, the red color, the green color, and the blue color) during one frame period. In each of the above embodiments, one or three pieces or more of the spatial light modulators are used, however, two or four pieces or more of the spatial light modulators may be also employed.

It is apparent that the present invention can be applied not only to a projection-type video display devices but also head-mount-type video display devices. It is also apparent that the present invention can be applied to a video display device in which a color of light to be applied to pixels adjacent to one another being placed on the spatial light modulator is made different from each other. Furthermore, it is also apparent that the present invention can be applied to a direct-view-type liquid crystal display device using LEDs each emitting light of one color of three primary colors (red, green, blue).

What is claimed is:

1. A video display device comprising:
   a red color light source to emit red color light;
   a green color light source to emit green color light;
   a blue color light source to emit blue color light;
   at least one spatial light modulator to spatially modulate, according to a video signal for a red color, a video signal for a green color, and a video signal for a blue color, said light fed from said red color light source, said light fed from said green color light source, and said light fed from said blue color light source;
   a selection controller to select a combination of a video signal for controlling said spatial light modulator and said light to be modulated; and
   a light quantity controller to control a time mean value of luminous flux of light to be modulated by said spatial light modulator, wherein
   said spatial light modulator spatially modulates said red color light according to said video signal of a red color and at least one of said video signals of a green color and a blue color,
   said green color light according to said video signal of a green color and at least one of said video signals of a blue color and a red color, and
   said blue color light according to said video signal of a blue color and at least one of said video signals of a red color and a green color.

2. The video display device according to claim 1, wherein, in said spatial light modulator, following equations hold among chromaticity coordinates $(xr0, yr0)$, $(xg0, yg0)$, and $(xb0, yb0)$ for light of a red color, a green color, and a blue color in specifications of colorimetry by which a video signal is defined according to CIE (Commision Internationale de l'Eclairage) 1931 standard colorimetric system, a time mean value of luminous flux of each of said red color, said green color, and said blue color, and chromaticity coordinates of said red color light, said green color light, and said blue color light defined in said standard colorimetric system; said following equations comprising:

$$xr0=(xr \times Lrr/yr + xg \times Lrg/yg + xb \times Lrb/yb)/(Lrr/yr+Lrg/yg+Lrb/yb)$$

$$yr0=(Lrr+Lrg+Lrb)/(Lrr/yr+Lrg/yg+Lrb/yb)$$

$$xg0=(xr \times Lgr/yr + xg \times Lgg/yg + xb \times Lgb/yb)/(Lgr/yr+Lgg/yg+Lgb/yb)$$

$$yg0=(Lgr+Lgg+Lgb)/(Lgr/yr+Lgg/yg+Lgb/yb)$$

$$xb0(xr \times Lbr/yr + xg \times Lbg/yg + xb \times Lbb/yb)/(Lbr/yr+Lbg/yg+Lbb/yb)$$

$$yb0=(Lbr+Lbg+Lbb)/(Lbr/yr+Lbg/yg+Lbb/yb)$$

wherein:
said $Lrr$ represents a time mean value of luminous flux of red color light to be modulated according to a video signal for a red color,
said $Lgr$ represents a time mean value of luminous flux of red color light to be modulated according to a video signal for a green color,
said $Lbr$ represents a time mean value of luminous flux of red color light to be modulated according to a video signal for a blue color,
said $Lrg$ represents a time mean value of luminous flux of green color light to be modulated according to a video signal for a red color,
said $Lgg$ represents a time mean value of luminous flux of green color light to be modulated according to a video signal for a green color,
said $Lbg$ represents a time mean value of luminous flux of green color light to be modulated according to a video signal for a blue color,
said $Lrb$ represents a time mean value of luminous flux of blue color light to be modulated according to a video signal for a red color,
said $Lgb$ represents a time mean value of luminous flux of blue color light to be modulated according to a video signal for a green color,
said $Lbb$ represents a time mean value of luminous flux of blue color light to be modulated according to a video signal for a blue color,
said $(xr, yr)$, said $(xg, yg)$, and said $(xb, Yb)$ represent chromaticity coordinates of said red color light, said green color light, and said blue color light, respectively, according to said standard colorimetric system.

3. The video display device according to claim 2, wherein following equations hold between chromaticity of coordinates $(xr0, yr0)$, $(xg0, yg0)$, and $(xb0, yb0)$ of light of, respectively, red, green, and blue colors in specifications of colorimetry by which a video signal is defined according to said standard colorimetric system and chromaticity coordinates $(xw, yw)$ of light of a standard white color in specifications of colorimetry by which a video signal is defined according to CIE (Commision Internationale de l'Eclairage) 1931 standard colorimetric system:

$$xw=(xr0 \times Lr/yr0 + xg0 \times Lg/yg0 + xb0 \times Lb/yb0)/(Lr/yr0+Lg/yg0+Lb/yb0)$$

$$yw=(Lr+Lg+Lb)/(Lr/yr0+Lg/yg0+Lb/yb0)$$

wherein:
said $Lr$ is defined to be $Lrr+Lrg+Lrb$,
said $Lg$ is defined to be $Lgr+Lgg+Lgb$, and
said $Lb$ is defined to be $Lbr+Lbg+Lbb$.

4. The video display device according to claim 1, wherein, in said spatial light modulator, following equations hold between chromaticity coordinates $(xr, yr)$, $(xg, yg)$, and $(xb, yb)$ of, respectively, red color light, green color light,
and blue color light according to said CIE (Commision Internationale de l'Eclairage) 1931 standard colorimetric system and chromaticity coordinates $(xw, yw)$ of a standard white color in specifications of colorimetry by which a video signal is defined as:

$$xw=(xr1 \times Lr/yr1 + xg1 \times Lg/yg1 + xb1 \times Lb/yb1)/(Lr/yr1+Lg/yg1+Lb/yb1)$$

$$yw=(Lr+Lg+Lb)/(Lr/yr1+Lg/yg1+Lb/yb1)$$

wherein:
said $Lrr$ represents a time mean value of luminous flux of red color light to be modulated according to a video signal for a red color, said Lgr represents a time mean value of luminous flux of red color light to be modulated according to a video signal for a green color, said Lbr represents a time mean value of luminous flux of red color light to be modulated according to a video signal for a blue color, said Lrg represents a time mean value of luminous flux of green color light to be modulated according to a video signal for a red color, said Lgg represents a time mean value of luminous flux of green color light to be modulated according to a video signal for a green color, said Lbg represents a time mean value of luminous flux of green color light to be modulated according to a video signal for a blue color, said Lrb represents a time mean value of luminous flux of blue color light to be modulated according to a video signal for a red color, said Lgb represents a time mean value of luminous flux of blue color light to be modulated according to a video signal for a green color, said Lbb represents a time mean value of luminous flux of blue color light to be modulated according to a video signal for a blue color, and wherein:

said Lr is defined to be $Lrr+Lrg+Lrb$, said Lg is defined to be $Lgr+Lgg+Lgb$, said Lb is defined to be $Lbr+Lbg+Lbb$, said xr1 is defined to be $(xr \times Lrr/yr + xg \times Lrg/yg + xb \times Lrb/yb)/(Lrr/yr + Lrg/yg + Lrb/yb)$, said yr1 is defined to be $(Lrr+Lrg+Lrb)/(Lrr/yr+Lrg/yg+Lrb/yb)$ said xg1 is defined to be $(xr \times Lgr/yr + xg \times Lgg/yg + xb \times Lgb/yb)/(Lgr/yr + Lgg/yg + Lgb/yb)$ said yg1 is defined to be $(Lgr+Lgg+Lgb)/(Lgr/yr+Lgg/yg+Lgb/yb)$ said xb1 is defined to be $(xr \times Lbr/yr + xg \times Lbg/yg + xb \times Lbb/yb)/(Lbr/yr + Lbg/yg + Lbb/yb)$ and said yb1 is defined to be $(Lbr+Lbg+Lbb)/(Lbr/yr+Lbg/yg+Lbb/yb)$.

5. The video display device according to claim 1, wherein following expressions hold:

$$Prr=Pgr=Pbr$$

$$Prg=Pgg=Pbg$$

$$Prb=Pgb=Pbb$$

wherein:

said Prr, said Pgr, and said Pbr represent luminous flux of red color light to be modulated according to a video signal for a red color, a video signal for a green color, and a video signal for a blue color, respectively, said Prg, said Pgg, and said Pbg represent luminous flux of green color light to be modulated according to a video signal for a red color, a video signal for a green color, and a video signal for a blue color, respectively, and said Prb, said Pgb, and said Pbb represent luminous flux of blue color light to be modulated according to a video signal for a red color, a video signal for a green color, and a video signal for a blue color, respectively.

6. The video display device according to claim 1, wherein a period is provided during which all light sources for each color are turned OFF during one frame period.

7. The video display device according to claim 1, wherein a light source for said red color light, said green color light, said blue color light, or said white color light comprises a light emitting diode.

8. The video display device according to claim 7, wherein said light source for said red color light, said green color light, said blue color light, or said white color light comprises a plurality of said light emitting diodes.

9. A video display device comprising:
a light applying unit to adjust luminous flux of each of a red color light, a green color light, and a blue color light and to switch said red color light, said green color light, and said blue color light in terms of time and to sequentially emit said red color light, said green color light, and said blue color light;
a spatial light modulator to spatially modulate light fed from said light applying unit; and
wherein said light applying unit is controlled so that,
when luminous flux of said red color light being emitted while said spatial light modulator is driven according to a video signal for a red color is expressed as Pr, when luminous flux of said green color light being emitted while said spatial light modulator is driven according to a video signal for a green color is expressed as Pg, and when luminous flux of said blue color light being emitted while said spatial light modulator is driven according to a video signal for a blue color is expressed as Pb, both said green color light having luminous flux of $K \times Pg$ (k being a coefficient and $0 \leq K \leq 1$ same as above) and said blue color light having luminous flux of $K \times Pb$ together with said red color light are applied when said spatial light modulator is driven according to said video signal for a red color, both said blue color light having luminous flux of $K \times Pb$ and said red color light having luminous flux of $K \times Pr$ together with said green color light are applied when said spatial light modulator is driven according to said video signal for a green color and both said red color light having luminous flux of $K \times Pr$, and said green color light having luminous flux of $K \times Pg$ together with said blue color light are applied when said spatial light modulator is driven according to said video signal for a blue color.

10. The color-sequence-type video display device according to claim 9, wherein, in said light applying unit, a value of said coefficient k is configured to be able to be changed.

11. The video display device according to claim 9, wherein a light source for said red color light, said green color light, said blue color light, or said white color light comprises a light emitting diode.

12. The video display device according to claim 11, wherein said light source for said red color light, said green color light, said blue color light, or said white color light comprises a plurality of said light emitting diodes.

13. A video display device comprising:
a light applying unit to adjust luminous flux of each of red color light, green color light, and blue color light and to switch said red color light, said green color light, and said blue color light in terms of time and to sequentially emit said red color light, said green color light, and said blue color light;
a spatial light modulator to spatially modulate light fed from said light applying unit; and
wherein said light applying unit is controlled so that red color light and white color light are applied to said spatial light modulator while said spatial light modulator is driven according to a video signal for a red color, a green color light and a white color light are applied to said spatial light modulator while said spatial light modulator is driven according to a video signal for a green color, and a blue color light and a white color light are applied to said spatial light modulator while said spatial light modulator is driven according to a video signal for a blue color.

14. The video display device according to claim 13, wherein said white color light is applied to said spatial light modulator according to driving timing for said spatial light modulator by said video signal for a red color, said video signal for a green color, and said video signal for a blue color.

15. The video display device according to claim 13, wherein said white color light is being lighted all the time.

16. The video display device according to claim 13, wherein brightness of said white color light is configured to be able to be changed by external control.

17. The video display device according to claim 13, wherein a light source for said red color light, said green color light, said blue color light, or said white color light comprises a light emitting diode.

18. The video display device according to claim 17, wherein said light source for said red color light, said green color light, said blue color light, or said white color light comprises a plurality of said light emitting diodes.

19. A video display device comprising:
a red color light source to emit red color light;
a green color light source to emit green color light;
a blue color light source to emit blue color light;
at least one spatial light modulating means for spatially modulating, according to a video signal for a red color, a video signal for a green color, and a video signal for a blue color, said light fed from said red color light source, said light fed from said green color light source, and said light fed from said blue color light source;
a selection controlling means for selecting a combination of a video signal for controlling said spatial light modulating means and said light to be modulated; and
a light quantity control means for controlling a time mean value of luminous flux of light to be modulated by said spatial light modulating means, wherein
said spatial light modulating means spatially modulates said red color light according to said video signal of a red color and at least one of said video signals of a green color and a blue color,
said green color light according to said video signal of a green color and at least one of said video signals of a blue color and a red color, and
said blue color light according to said video signal of a blue color and at least one of said video signals of a red color and a green color.

20. The video display device according to claim 19, wherein, in said spatial light modulating means, following equations hold among chromaticity coordinates (xr0, yr0), (xg0, yg0), and (xb0, yb0) for light of a red color, a green color, and a blue color in specifications of colorimetry by which a video signal is defined according to CIE (Commision Internationale de l'Eclairage) 1931 standard colorimetric system, a time mean value of luminous flux of each of said red color, said green color, and said blue color, and chromaticity coordinates of said red color light, said green color light, and said blue color light defined in said standard colorimetric system; said following equations comprising:

$$xr0=(xr \times Lrr/yr + xg \times Lrg/yg + xb \times Lrb/yb)/(Lrr/yr + Lrg/yg + Lrb/yb)$$

$$yr0=(Lrr + Lrg + Lrb)/(Lrr/yr + Lrg/yg + Lrb/yb)$$

$$xg0=(xr \times Lgr/yr + xg \times Lgg/yg + xb \times Lgb/yb)/(Lgr/yr + Lgg/yg + Lgb/yb)$$

$$yg0=(Lgr + Lgg + Lgb)/(Lgr/yr + Lgg/yg + Lgb/yb)$$

$$xb0=(xr \times Lbr/yr + xg \times Lbg/yg + xb \times Lbb/yb)/(Lbr/yr + Lbg/yg + Lbb/yb)$$

$$yb0=(Lbr + Lbg + Lbb)/(Lbr/yr + Lbg/yg + Lbb/yb)$$

wherein:
said Lrr represents a time mean value of luminous flux of red color light to be modulated according to a video signal for a red color,
said Lgr represents a time mean value of luminous flux of red color light to be modulated according to a video signal for a green color,
said Lbr represents a time mean value of luminous flux of red color light to be modulated according to a video signal for a blue color,
said Lrg represents a time mean value of luminous flux of green color light to be modulated according to a video signal for a red color,
said Lgg represents a time mean value of luminous flux of green color light to be modulated according to a video signal for a green color,
said Lbg represents a time mean value of luminous flux of green color light to be modulated according to a video signal for a blue color,
said Lrb represents a time mean value of luminous flux of blue color light to be modulated according to a video signal for a red color,
said Lgb represents a time mean value of luminous flux of blue color light to be modulated according to a video signal for a green color,
said Lbb represents a time mean value of luminous flux of blue color light to be modulated according to a video signal for a blue color,
said (xr, yr), said (xg, yg), and said (xb, Yb) represent chromaticity coordinates of said red color light, said green color light, and said blue color light, respectively, according to said standard colorimetric system.

21. The video display device according to claim 20, wherein following equations hold between chromaticity of coordinates (xr0, yr0), (xg0, yg0), and (xb0, yb0) of light of, respectively, red, green, and blue colors in specifications of colorimetry by which a video signal is defined according to said standard colorimetric system and chromaticity coordinates (xw, yw) of light of a standard white color in specifications of colorimetry by which a video signal is defined according to CIE (Commision Internationale de l'Eclairage) 1931 standard colorimetric system:

$$xw=(xr0 \times Lr/yr0 + xg0 \times Lg/yg0 + xb0 \times Lb/yb0)/(Lr/yr0 + Lg/yg0 + Lb/yb0)$$

$$yw=(Lr + Lg + Lb)/(Lr/yr0 + Lg/yg0 + Lb/yb0)$$

wherein:
said Lr is defined to be Lrr+Lrg+Lrb,
said Lg is defined to be Lgr+Lgg+Lgb, and
said Lb is defined to be Lbr+Lbg+Lbb.

22. The video display device according to claim 19, wherein, in said spatial light modulating means, following equations hold between chromaticity coordinates (xr, yr), (xg, yg), and (xb, yb) of, respectively, red color light, green color light, and blue color light according to said CIE (Commision Internationale de l'Eclairage) 1931 standard colorimetric system and chromaticity coordinates (xw, yw)

of a standard white color in specifications of colorimetry by which a video signal is defined as:

$$xw=(xr1 \times Lr/yr1+xg1 \times Lg/yg1+xb1 \times Lb/yb1)/(Lr/yr1+Lg/yg1+Lb/yb1)$$

$$yw=(Lr+Lg+Lb)/(Lr/yr1+Lg/yg1+Lb/yb1)$$

wherein:
said Lrr represents a time mean value of luminous flux of red color light to be modulated according to a video signal for a red color,
said Lgr represents a time mean value of luminous flux of red color light to be modulated according to a video signal for a green color,
said Lbr represents a time mean value of luminous flux of red color light to be modulated according to a video signal for a blue color,
said Lrg represents a time mean value of luminous flux of green color light to be modulated according to a video signal for a red color,
said Lgg represents a time mean value of luminous flux of green color light to be modulated according to a video signal for a green color,
said Lbg represents a time mean value of luminous flux of green color light to be modulated according to a video signal for a blue color,
said Lrb represents a time mean value of luminous flux of blue color light to be modulated according to a video signal for a red color,
said Lgb represents a time mean value of luminous flux of blue color light to be modulated according to a video signal for a green color,
said Lbb represents a time mean value of luminous flux of blue color light to be modulated according to a video signal for a blue color, and
wherein:
said Lr is defined to be Lrr+Lrg+Lrb,
said Lg is defined to be Lgr+Lgg+Lgb,
said Lb is defined to be Lbr+Lbg+Lbb,
said xr1 is defined to be $(xr \times Lrr/yr+xg \times Lrg/yg+xb \times Lrb/yb)/(Lrr/yr+Lrg/yg+Lrb/yb)$,
said yr1 is defined to be $(Lrr+Lrg+Lrb)/(Lrr/yr+Lrg/yg+Lrb/yb)$
said xg1 is defined to be $(xr \times Lgr/yr+xg \times Lgg/yg+xb \times Lgb/yb)/(Lgr/yr+Lgg/yg+Lgb/yb)$
said yg1 is defined to be $(Lgr+Lgg+Lgb)/(Lgr/yr+Lgg/yg+Lgb/yb)$
said xb1 is defined to be $(xr \times Lbr/yr+xg \times Lbg/yg+xb \times Lbb/yb)/(Lbr/yr+Lbg/yg+Lbb/yb)$ and
said yb1 is defined to be $(Lbr+Lbg+Lbb)/(Lbr/yr+Lbg/yg+Lbb/yb)$.

23. The video display device according to claim 19, wherein following expressions hold:

$$Prr=Pgr=Pbr$$

$$Prg=Pgg=Pbg$$

$$Prb=Pgb=Pbb$$

wherein:
said Prr, said Pgr, and said Pbr represent luminous flux of red color light to be modulated according to a video signal for a red color, a video signal for a green color, and a video signal for a blue color, respectively,
said Prg, said Pgg, and said Pbg represent luminous flux of green color light to be modulated according to a video signal for a red color, a video signal for a green color, and a video signal for a blue color, respectively, and
said Prb, said Pgb, and said Pbb represent luminous flux of blue color light to be modulated according to a video signal for a red color, a video signal for a green color, and a video signal for a blue color, respectively.

24. A video display device comprising:
a light applying means to adjust luminous flux of each of a red color light, a green color light, and a blue color light and to switch said red color light, said green color light, and said blue color light in terms of time and to sequentially emit said red color light, said green color light, and said blue color light;
a spatial light modulating means to spatially modulate light fed from said light applying means; and
wherein said light applying means is controlled so that, when luminous flux of said red color light being emitted while said spatial light modulating means is driven according to a video signal for a red color is expressed as Pr, when luminous flux of said green color light being emitted while said spatial light modulating means is driven according to a video signal for a green color is expressed as Pg, and when luminous flux of said blue color light being emitted while said spatial light modulating means is driven according to a video signal for a blue color is expressed as Pb, both said green color light having luminous flux of K×Pg (k being a coefficient and $0 \leq K \leq 1$ same as above) and said blue color light having luminous flux of K×Pb together with said red color light are applied when said spatial light modulating means is driven according to said video signal for a red color, both said blue color light having luminous flux of K×Pb and said red color light having luminous flux of K×Pr together with said green color light are applied when said spatial light modulating means is driven according to said video signal for a green color and both said red color light having luminous flux of K×Pr, and said green color light having luminous flux of K×Pg together with said blue color light are applied when said spatial light modulating means is driven according to said video signal for a blue color.

25. The color-sequence-type video display device according to claim 24, wherein, in said light applying means, a value of said coefficient k is configured to be able to be changed.

26. A video display device comprising:
a light applying means to adjust luminous flux of each of red color light, green color light, and blue color light and to switch said red color light, said green color light, and said blue color light in terms of time and to sequentially emit said red color light, said green color light, and said blue color light;
a spatial light modulating means to spatially modulate light fed from said light applying means; and
wherein said light applying means is controlled so that red color light and white color light are applied to said spatial light modulating means while said spatial light modulating means is driven according to a video signal for a red color, a green color light and a white color light are applied to said spatial light modulating means while said spatial light modulating means is driven according to a video signal for a green color, and a blue color light and a white color light are applied to said spatial light modulating means while said spatial light modulating means is driven according to a video signal for a blue color.

27. The video display device according to claim 26, wherein said white color light is applied to said spatial light modulating means according to driving timing for said spatial light modulating means by said video signal for a red color, said video signal for a green color, and said video signal for a blue color.

28. The video display device according to claim 26, wherein said white color light is being lighted all the time.

* * * * *